(12) United States Patent
Piel

(10) Patent No.: US 11,880,842 B2
(45) Date of Patent: Jan. 23, 2024

(54) UNITED STATES SYSTEM AND METHODS FOR DYNAMICALLY DETERMINED CONTEXTUAL, USER-DEFINED, AND ADAPTIVE AUTHENTICATION

(71) Applicant: MASTERCARD INTERNATIONAL INCORPORATED, Purchase, NY (US)

(72) Inventor: Brian Piel, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 346 days.

(21) Appl. No.: 16/222,780

(22) Filed: Dec. 17, 2018

(65) Prior Publication Data

US 2020/0193443 A1 Jun. 18, 2020

(51) Int. Cl.
*G06Q 20/40* (2012.01)
*G06N 20/00* (2019.01)
*G06Q 20/38* (2012.01)

(52) U.S. Cl.
CPC ....... *G06Q 20/40145* (2013.01); *G06N 20/00* (2019.01); *G06Q 20/3823* (2013.01); *G06Q 20/4097* (2013.01)

(58) Field of Classification Search
CPC .................. G06Q 20/00–425; H04L 9/00–50
See application file for complete search history.

(56) References Cited

U.S. PATENT DOCUMENTS

| | | | | |
|---|---|---|---|---|
| 6,983,379 B1 * | 1/2006 | Spalink | ............... | G06F 21/6254 |
| | | | | 705/7.29 |
| 7,216,109 B1 * | 5/2007 | Donner | ............... | G06Q 20/382 |
| | | | | 235/382 |
| 7,428,511 B2 * | 9/2008 | Takahashi | ............... | G07F 9/002 |
| | | | | 705/44 |

(Continued)

FOREIGN PATENT DOCUMENTS

JP 2017156979 A 9/2017

OTHER PUBLICATIONS

Credit Card Fraud Detection at Merchant Side using Neural Networks (Year: 2016).*

(Continued)

*Primary Examiner* — Ari Shahabi
(74) *Attorney, Agent, or Firm* — Armstrong Teasdale LLP

(57) ABSTRACT

An adaptive authentication (AA) computer device used for improved payment transaction authentication services is provided. The AA computer device includes at least one processor in communication with at least one memory device and is configured to retrieve historical transaction data and authentication types for each historical transaction. The AA computer device is also configured to generate a model associating each of the authentication types with a corresponding set of values for transaction parameters. The AA computer device is further configured to receive pending transaction data including a cardholder identifier of a first cardholder, a merchant identifier, and a transaction amount. The AA computer device is further configured to determine (Continued)

an authentication type by applying the model to the transaction parameters derived from the pending transaction and transmit to the first cardholder an authentication request of the authentication type.

17 Claims, 8 Drawing Sheets

(56) References Cited

U.S. PATENT DOCUMENTS

| | | | | |
|---|---|---|---|---|
| 7,430,520 | B1* | 9/2008 | Haugen | G06Q 30/02 235/382 |
| 8,181,858 | B2* | 5/2012 | Carter | G06Q 20/425 705/17 |
| 8,255,971 | B1* | 8/2012 | Webb | G06Q 20/4014 705/17 |
| 8,285,656 | B1* | 10/2012 | Chang | G06Q 50/01 706/45 |
| 8,572,391 | B2 | 10/2013 | Golan et al. | |
| 8,646,060 | B1* | 2/2014 | Ben Ayed | H04W 4/20 726/9 |
| 8,875,267 | B1 | 10/2014 | Kolman et al. | |
| 8,905,303 | B1* | 12/2014 | Ben Ayed | G06Q 20/401 235/375 |
| 9,019,075 | B2* | 4/2015 | Hayashida | G07C 9/37 340/5.82 |
| 9,213,814 | B2* | 12/2015 | Grigg | H04L 63/10 |
| 9,246,899 | B1* | 1/2016 | Durney | H04L 29/06 |
| 9,619,801 | B2* | 4/2017 | Sikljovan | H04W 12/069 |
| 9,686,272 | B2* | 6/2017 | Blinn | H04L 63/0861 |
| 9,832,189 | B2* | 11/2017 | Han | G06F 21/62 |
| 9,959,539 | B2* | 5/2018 | Han | G06Q 20/4014 |
| 9,990,632 | B1* | 6/2018 | Koeppel | G06Q 20/352 |
| 9,992,676 | B2* | 6/2018 | Shi | H04W 12/64 |
| 10,154,372 | B1* | 12/2018 | Vltavsky | H04W 4/021 |
| 10,212,158 | B2* | 2/2019 | Han | G06F 21/32 |
| 10,269,017 | B1* | 4/2019 | Phillips | G06Q 20/40145 |
| 10,319,476 | B1* | 6/2019 | LaBorde | G06N 3/08 |
| 10,331,866 | B2* | 6/2019 | Meir | H04L 63/0861 |
| 10,331,937 | B2* | 6/2019 | Goldberg | H04W 12/126 |
| 10,623,887 | B2* | 4/2020 | Lalka | H04L 43/10 |
| 10,659,932 | B2* | 5/2020 | Todasco | H04W 4/025 |
| 10,679,211 | B1* | 6/2020 | Suen | G06Q 20/382 |
| 10,733,592 | B2* | 8/2020 | Douglas | G06Q 20/321 |
| 10,735,193 | B1* | 8/2020 | Knas | H04L 9/3239 |
| 10,735,412 | B2* | 8/2020 | Alsina | G06Q 20/04 |
| 10,755,281 | B1* | 8/2020 | Yip | G06Q 20/4016 |
| 11,195,205 | B2* | 12/2021 | Jarvis | G06F 16/288 |
| 2002/0065784 | A1* | 5/2002 | Ranzini | G06Q 20/40 705/64 |
| 2003/0018918 | A1* | 1/2003 | Natsuno | H04W 12/06 726/4 |
| 2003/0115142 | A1* | 6/2003 | Brickell | G07C 9/22 705/51 |
| 2003/0191594 | A1* | 10/2003 | Kondo | G06F 21/316 702/80 |
| 2004/0083394 | A1* | 4/2004 | Brebner | G06Q 20/382 726/19 |
| 2004/0267643 | A1* | 12/2004 | Armes | G06Q 20/10 705/30 |
| 2005/0097320 | A1* | 5/2005 | Golan | G06Q 20/4014 713/166 |
| 2005/0127167 | A1* | 6/2005 | Nakajima | G06Q 20/40145 235/382 |
| 2006/0041507 | A1* | 2/2006 | Novack | G06F 21/31 705/50 |
| 2006/0122921 | A1* | 6/2006 | Comerford | G06Q 30/0224 705/35 |
| 2006/0156385 | A1* | 7/2006 | Chiviendacz | H04L 9/3271 726/2 |
| 2007/0000994 | A1* | 1/2007 | Michelassi | G06Q 40/00 705/45 |
| 2007/0143832 | A1* | 6/2007 | Perrella | H04L 9/3271 726/5 |
| 2008/0005037 | A1* | 1/2008 | Hammad | G06Q 20/3674 705/67 |
| 2008/0120214 | A1* | 5/2008 | Steele | G07F 7/1008 705/35 |
| 2009/0152343 | A1* | 6/2009 | Carter | G06Q 20/02 235/379 |
| 2009/0199264 | A1* | 8/2009 | Lang | G06F 21/31 726/1 |
| 2009/0221266 | A1* | 9/2009 | Ohta | H04W 12/082 455/411 |
| 2009/0299863 | A1* | 12/2009 | Shah | G06Q 20/20 705/16 |
| 2011/0023099 | A1* | 1/2011 | Kim | G06F 21/33 726/5 |
| 2011/0047608 | A1* | 2/2011 | Levenberg | H04L 63/0807 726/7 |
| 2011/0215921 | A1* | 9/2011 | Ben Ayed | G08B 1/08 340/539.11 |
| 2012/0166810 | A1* | 6/2012 | Tao | G06F 21/32 713/186 |
| 2012/0323717 | A1* | 12/2012 | Kirsch | G06Q 20/3829 705/26.1 |
| 2013/0166398 | A1* | 6/2013 | Minde | G06Q 20/322 705/16 |
| 2014/0172707 | A1* | 6/2014 | Kuntagod | G06Q 20/3224 705/44 |
| 2014/0180850 | A1* | 6/2014 | Ackley | G06Q 20/3274 705/16 |
| 2015/0161608 | A1* | 6/2015 | Gilbert | G06Q 20/4014 705/44 |
| 2015/0227729 | A1* | 8/2015 | Grigg | G06Q 40/02 726/7 |
| 2015/0229623 | A1* | 8/2015 | Grigg | G06Q 20/384 726/7 |
| 2015/0278797 | A1* | 10/2015 | Ratts | G06Q 20/405 705/44 |
| 2017/0093920 | A1* | 3/2017 | Ducatel | G06F 21/316 |
| 2017/0109752 | A1* | 4/2017 | Hubbard | H04L 63/10 |
| 2017/0213282 | A1* | 7/2017 | Dziuk | G06Q 40/025 |
| 2017/0286648 | A1* | 10/2017 | Yamaguchi | G06F 21/31 |
| 2017/0364916 | A1* | 12/2017 | Nidamanuri | H04L 67/535 |
| 2018/0053105 | A1* | 2/2018 | Paul | G06F 21/32 |
| 2018/0053185 | A1* | 2/2018 | Kohli | G06Q 30/0613 |
| 2018/0137504 | A1* | 5/2018 | Goldenberg | G06Q 20/4016 |
| 2018/0276710 | A1* | 9/2018 | Tietzen | G06Q 30/0269 |
| 2019/0114606 | A1* | 4/2019 | Nuzum | G06Q 20/3278 |
| 2019/0272360 | A1* | 9/2019 | Kursun | H04L 67/306 |
| 2019/0287097 | A1* | 9/2019 | Chitilian | G06Q 20/325 |
| 2019/0385160 | A1* | 12/2019 | Safak | G06Q 20/3274 |
| 2019/0392450 | A1* | 12/2019 | Gosset | G06Q 20/12 |
| 2020/0027092 | A1* | 1/2020 | Mossoba | G06Q 20/0855 |
| 2020/0162515 | A1* | 5/2020 | Dubinsky | G06F 21/45 |
| 2020/0193443 | A1* | 6/2020 | Piel | G06N 20/00 |
| 2020/0265409 | A1* | 8/2020 | Babu | G06N 20/00 |
| 2020/0311790 | A1* | 10/2020 | Keren | G06F 16/2379 |
| 2021/0012402 | A1* | 1/2021 | Ellison | G06Q 30/0613 |
| 2021/0035140 | A1* | 2/2021 | Fuzayloff | G06F 40/40 |
| 2021/0365977 | A1* | 11/2021 | Zarakas | G06Q 30/0611 |
| 2023/0004973 | A1* | 1/2023 | Edwards | G06Q 20/3224 |
| 2023/0035570 | A1* | 2/2023 | Edwards | G06Q 20/40 |

OTHER PUBLICATIONS

PCT International Search Report and Written Opinion, Application No. PCT/US2019/064841, dated Jul. 3, 2020, 10 pps.

European Extended Search Report, Application No. 19899580.5, dated Aug. 11, 2022, 9 pps.

* cited by examiner

UNITED STATES SYSTEM AND METHODS FOR DYNAMICALLY DETERMINED CONTEXTUAL, USER-DEFINED, AND ADAPTIVE AUTHENTICATION

BACKGROUND

The field of the invention relates generally to systems and methods for authenticating users during events that may trigger security protocols, and in particular, to user-defined, context-specific, and learned, rules and methods for engaging in authentications.

At least some known authentication procedures involve fraudulent activity. These fraudulent activities present liability issues to one or more parties involved in the transaction. For example, a visitor entering a secure area may be required to provide identification to authenticate their identity. An area which contains sensitive data, such as information related to health privacy or financial data, may require security procedures for visitors that have never been to the location before. In some cases, displaying identification or scanning access cards may be the extent of a security screening. Physical items like these may be lost or stolen and used by unauthorized individuals to gain access to restricted areas. In the event of fraudulent access, a malicious visitor of a place or malicious user of a secure system could cause irreparable harm.

Authentication procedures also apply to secure systems involving financial transactions that require multiple parties, such as an issuing bank, a merchant, a payment processing network, the user of the payment card, and an acquirer bank. As such, these parties are interested in detecting and preventing fraudulent activity. In cases of payment transactions, there exists a need to analyze the data surrounding a payment card transaction before authenticating the transaction. Analyzing the payment transaction data may be used to determine if the transaction is credible and if the transaction should proceed. Parties place themselves at risk of fraud in the absence of the ability to quickly analyze the details of the payment transaction. For example, in online transactions through a merchant web site or "card-not-present" transactions, the merchant party in the transaction oftentimes assumes the initial liability for certain aspects of the transaction unless, for example, certain security procedures are undertaken.

Current methods of authentication are not personalized and may require actions users find inconvenient. In some cases an authentication request may be communicated to the cardholder in a way that the cardholder may not immediately receive. In addition, authentications are not situation-specific. The same authentication types may be presented regardless of transaction amounts or proximity to a central location, such as a user residence. In addition, frequent visits to the same merchant may unnecessarily require authentications for each visit. In other situations, a visit to a place with higher potential for fraud may not require any authentication. Alerting users to heightened risks through elevated and more sophisticated authentications may potentially reduce the likelihood of users engaging in risky transactions. Instituting authentications at places associated with higher risk factors may also prevent fraud. In addition to the added convenience, a way to present users with authentication types that more accurately reflect the risk associated with certain transactions is needed.

BRIEF DESCRIPTION

In one aspect, an adaptive authentication (AA) computer device used for improved payment transaction authentication services is provided. The AA computer device comprises at least one processor in communication with at least one memory device. The AA computer device is configured to retrieve, from a database, (i) historical transaction data for a plurality of historical transactions processed over a payment processing network, and (ii) a respective one of a plurality of cardholder authentication types used for each of the historical transactions. The AA computer device is also configured to generate a model associating each of the plurality of cardholder authentication types with a corresponding set of values for transaction parameters derived from the historical transaction data, wherein the transaction parameters include at least one of a transaction amount range, a transaction geographic location, a merchant identifier, and a merchant category. The AA computer device is further configured to receive pending transaction data for a pending transaction on the payment processing network, the pending transaction data including at least a cardholder identifier of a first cardholder, a pending transaction merchant identifier, and a pending transaction amount. The AA computer device is also configured to determine a candidate cardholder authentication type for the pending transaction by applying the model to the transaction parameters derived from the pending transaction data. The AA computer device is further configured to transmit to the first cardholder an authentication request of the candidate cardholder authentication type.

In another aspect, a computer-implemented method for improved payment transaction authentication services is provided. The method is implemented using an adaptive authentication (AA) computer device including at least one processor in communication with at least one memory device. The method includes retrieving, from a database, (i) historical transaction data for a plurality of historical transactions processed over a payment processing network, and (ii) a respective one of a plurality of cardholder authentication types used for each of the historical transactions. The method also includes generating a model associating each of the plurality of cardholder authentication types with a corresponding set of values for transaction parameters derived from the historical transaction data, wherein the transaction parameters include at least one of a transaction amount range, a transaction geographic location, a merchant identifier, and a merchant category. The method further includes receiving pending transaction data for a pending transaction on the payment processing network, the pending transaction data including at least a cardholder identifier of a first cardholder, a pending transaction merchant identifier, and a pending transaction amount. The method further includes determining a candidate cardholder authentication type for the pending transaction by applying the model to the transaction parameters derived from the pending transaction data. The method also includes transmitting to the first cardholder an authentication request of the candidate cardholder authentication type.

In a further aspect, at least one non-transitory computer-readable storage medium having computer-executable instructions for improved payment transaction authentication services is provided. When executed by an adaptive authentication (AA) computer device including at least one processor in communication with at least one memory device, the computer executable instructions cause the AA computing device to retrieve, from a database, (i) historical transaction data for a plurality of historical transactions processed over a payment processing network, and (ii) a respective one of a plurality of cardholder authentication types used for each of the historical transactions. The computer executable instructions also cause the AA computing device to generate a model associating each of the plurality of cardholder authentication types with a corresponding set of values for transaction parameters derived from the historical transaction data, wherein the transaction parameters include at least one of a transaction amount range, a transaction geographic location, a merchant identifier, and a merchant category. The computer executable instructions further cause the AA computing device to receive pending transaction data for a pending transaction on the payment processing network, the pending transaction data including at least a cardholder identifier of a first cardholder, a pending transaction merchant identifier, and a pending transaction amount. The computer executable instructions further cause the AA computing device to determine a candidate cardholder authentication type for the pending transaction by applying the model to the transaction parameters derived from the pending transaction data. The computer executable instructions further cause the AA computing device to transmit to the first cardholder an authentication request of the candidate cardholder authentication type.

BRIEF DESCRIPTION OF THE DRAWINGS

FIG. 1 is a schematic diagram illustrating an adaptive authentication (AA) computer system including an AA computer device in communication with a multi-party payment card processing system in accordance with one embodiment of the present disclosure.

FIG. 2 is a simplified block diagram of an example AA computer device shown in FIG. 1 in communication with example components used for AA, in accordance with one embodiment of the present disclosure.

FIG. 3 is a simplified block diagram of an example model engine for generating an output model shown in FIG. 2 for dynamically determining an authentication type, in accordance with one embodiment of the present disclosure.

FIG. 4 is a simplified block diagram of an example AA computer system using an AA computer device shown in FIG. 1.

FIG. 5 illustrates an example configuration of a client system shown in FIG. 4, in accordance with one embodiment of the present disclosure.

FIG. 6 illustrates an example configuration of a server system shown in FIG. 4, in accordance with one embodiment of the present disclosure.

FIG. 7 is a flow chart of a process for enhancing user authentication using the system shown in FIG. 1.

FIG. 8 is a diagram of components of one or more example computer devices that may be used in the system shown in FIG. 1.

DETAILED DESCRIPTION OF THE DISCLOSURE

Figure 1:
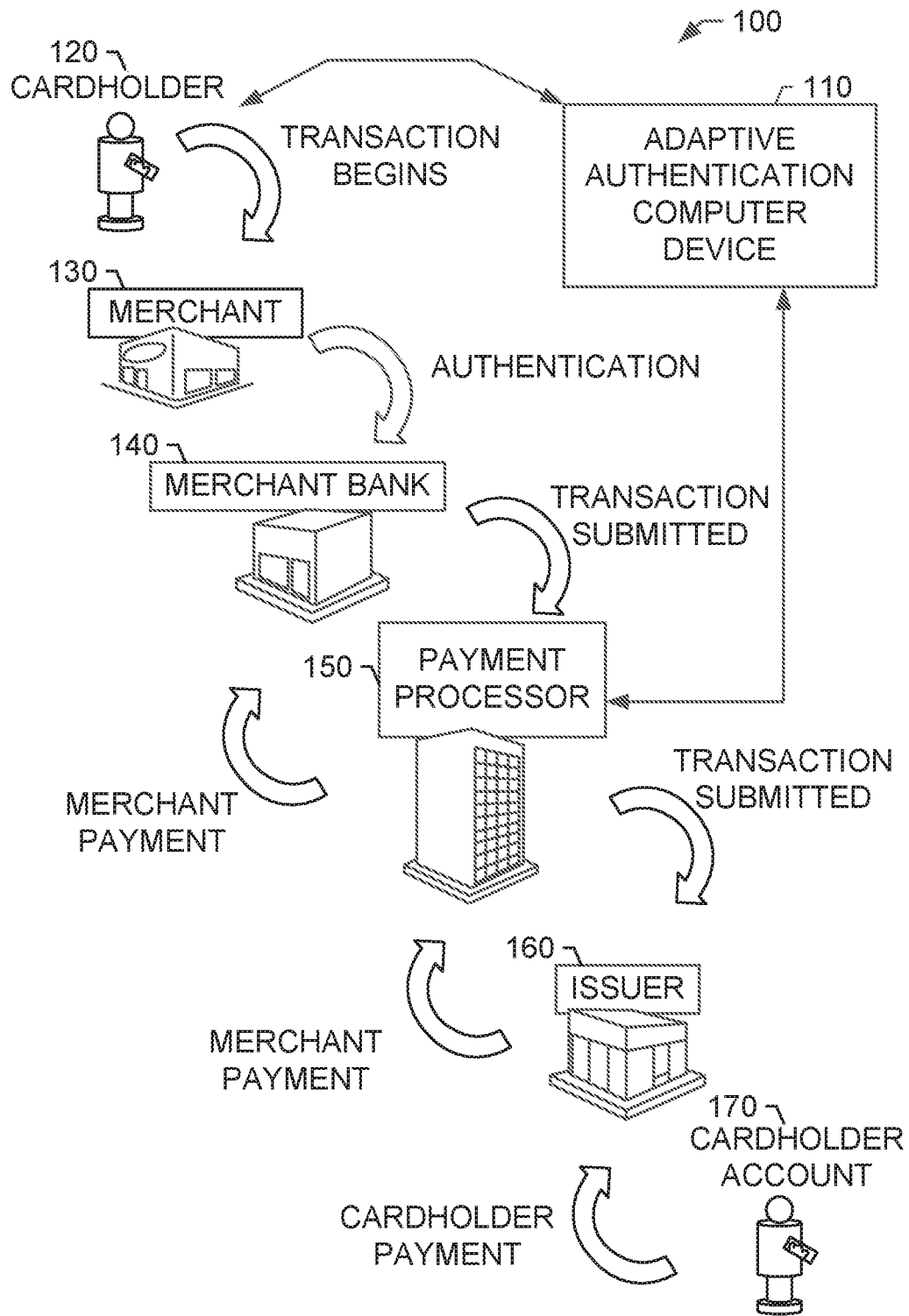
FIGS. 1-8 show example embodiments, of the methods and systems described herein.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to example embodiments, namely, systems and methods utilizing user configurations of authentication types and communication methods coupled with machine learning and data analysis and interpretation techniques to initiate authentication requests to cardholders using a decentralized network in real time. Systems and methods according to the disclosure herein thus provide real-time analysis of cardholder defined data, situation-specific contextual data, and adaptively learned data analysis for improved fraud prevention and cardholder convenience during transactions.

In the example embodiment, an adaptive authentication (AA) computer device for improved payment transaction authentication services is provided. The AA computer device includes at least one processor in communication with at least one memory device. The AA computer device is configured to retrieve, from a database: (i) historical transaction data for a plurality of historical transactions processed over a payment processing network, and (ii) a respective one of a plurality of cardholder authentication types used for each of the historical transactions. The AA computer device is also configured to generate a model associating each of the plurality of cardholder authentication types with a corresponding set of values for transaction parameters derived from the historical transaction data. The transaction parameters include at least one of a transaction amount range, a transaction geographic location, a merchant identifier, and a merchant category. The AA computer device is further configured to receive pending transaction data for a pending transaction on the payment processing network, the pending transaction data including at least a cardholder identifier of a first cardholder, a pending transaction merchant identifier, and a pending transaction amount. The AA computer device is further configured to determine a candidate cardholder authentication type for the pending transaction by applying the model to the transaction parameters derived from the pending transaction data. The AA computer device is further configured to transmit to the first cardholder an authentication request of the candidate cardholder authentication type.

In some embodiments, the AA computer device is configured to retrieve the historical transaction data for the plurality of historical transactions for which at least one of (i) the merchant identifier of the historical transaction data matches the pending transaction merchant identifier, (ii) the merchant category of the historical transaction data matches a pending transaction merchant category, and (iii) a transaction amount of the historical transaction data and the pending transaction amount are within the same transaction amount range.

In other embodiments, each of the plurality of historical transactions is associated with the first cardholder. In yet other embodiments, each of the plurality of historical transactions is associated with a respective cardholder other than the first cardholder. In further embodiments the candidate cardholder authentication type is one of a PIN, a one-time password, a pattern code, a passcode, a digital signature, a signature capture, a biometric signature, a biometric sample, a challenge question, a low-energy infrared retinal scan, a finger vein scan, a near infrared iris scan, an optical fingerprint scan, a three-dimensional (3D) fingerprint scan, an optical palm print, a 3D facial scan, an optical facial scan, and a speech recognition sample.

In some embodiments, the AA computer device is configured to retrieve, from the database using the cardholder identifier, a preferred contact channel of the cardholder. The preferred contact channel includes at least one of a text message, an email, a telephone call, a link to a website, and a point-of-sale device. In other embodiments, the AA computer device is configured to: (i) transmit, to the cardholder associated with the cardholder identifier in response to the pending transaction data, a request to identify a preferred one of the cardholder authentication types, (ii) receive, from the cardholder, an identified one of the cardholder authentication types, (iii) update the model based on the identified cardholder authentication type and the transaction parameters for the pending transaction, and (iv) associate the updated model in the database with the cardholder identifier.

In some embodiments, the transaction geographic location is defined relative to a cardholder's home geographic area.

In another embodiment, a computer-implemented method for improved payment transaction authentication services is provided. The method is implemented using an adaptive authentication (AA) computer device including at least one processor in communication with at least one memory device. The computer-implemented method includes retrieving, from a database, (i) historical transaction data for a plurality of historical transactions processed over a payment processing network, and (ii) a respective one of a plurality of cardholder authentication types used for each of the historical transactions. The method also includes generating a model associating each of the plurality of cardholder authentication types with a corresponding set of values for transaction parameters derived from the historical transaction data, wherein the transaction parameters include at least one of a transaction amount range, a transaction geographic location, a merchant identifier, and a merchant category. The method further includes receiving pending transaction data for a pending transaction on the payment processing network, the pending transaction data including at least a cardholder identifier of a first cardholder, a pending transaction merchant identifier, and a pending transaction amount. The method further includes determining a candidate cardholder authentication type for the pending transaction by applying the model to the transaction parameters derived from the pending transaction data. The method also includes transmitting to the first cardholder an authentication request of the candidate cardholder authentication type.

In some embodiments the method includes retrieving the historical transaction data for the plurality of historical transactions for which at least one of (i) the merchant identifier of the historical transaction data matches the pending transaction merchant identifier, (ii) the merchant category of the historical transaction data matches a pending transaction merchant category, and (iii) a transaction amount of the historical transaction data and the pending transaction amount are within the same transaction amount range.

In some embodiments, the method includes retrieving, from the database using the cardholder identifier, a preferred contact channel of the cardholder. The preferred contact channel includes at least one of a text message, an email, a telephone call, a link to a website, and a point-of-sale device.

In other embodiments, the method includes: (i) transmitting, to the cardholder associated with the cardholder identifier in response to the pending transaction data, a request to identify a preferred one of the cardholder authentication types, (ii) receiving, from the cardholder, an identified one of the cardholder authentication types, (iii) updating the model based on the identified cardholder authentication type and the transaction parameters for the pending transaction, and (iv) associating the updated model in the database with the cardholder identifier.

In another embodiment, at least one non-transitory computer-readable storage medium having computer-executable instructions embodied thereon is provided. When the computer-executable instructions are executed by an adaptive authentication (AA) computer device including at least one processor in communication with at least one memory device, the computer-executable instructions cause the at least one processor to retrieve, from a database, (i) historical transaction data for a plurality of historical transactions processed over a payment processing network, and (ii) a respective one of a plurality of cardholder authentication types used for each of the historical transactions. The computer executable-instructions also cause the at least one processor to generate a model associating each of the plurality of cardholder authentication types with a corresponding set of values for transaction parameters derived from the historical transaction data. The transaction parameters include at least one of a transaction amount range, a transaction geographic location, a merchant identifier, and a merchant category. The computer executable-instructions further cause the at least one processor to receive pending transaction data for a pending transaction on the payment processing network, the pending transaction data including at least a cardholder identifier of a first cardholder, a pending transaction merchant identifier, and a pending transaction amount. The computer executable-instructions also cause the at least one processor to determine a candidate cardholder authentication type for the pending transaction by applying the model to the transaction parameters derived from the pending transaction data. The computer executable-instructions further cause the at least one processor to transmit to the first cardholder an authentication request of the candidate cardholder authentication type.

In some embodiments, the computer-executable instructions further cause the at least one processor to retrieve the historical transaction data for the plurality of historical transactions for which at least one of (i) the merchant identifier of the historical transaction data matches the pending transaction merchant identifier, (ii) the merchant category of the historical transaction data matches a pending transaction merchant category, and (iii) a transaction amount of the historical transaction data and the pending transaction amount are within the same transaction amount range.

As discussed herein, one risk-mitigating step against fraudulent payment transactions is user authentication. For example, some payment networks engage an authentication service that performs an authentication of a suspect consumer (e.g., suspect cardholder) prior to authorization of a payment transaction. The authentication service determines if the source of the payment transaction is the authorized user of the payment card and/or payment account (e.g., actual or legitimate cardholder). During such an authentication process, the suspect consumer (e.g., the person attempting to perform the payment transaction with the merchant) may be presented with an authentication request, sometimes called a "step-up challenge." This step-up challenge generally requires the suspect consumer to provide a password or a passcode from a second factor device (e.g., mobile phones, Smartphones, personal digital assistants (PDAs), and/or computers) before the payment transaction will be processed. For example, the step-up challenge may be provided by an authentication service such as a 3-D SECURE® protocol (3DS) (e.g., EMV® 3-D Secure by EMVCo., LLC.; Verified by Visa by Visa International Service Association, Delaware; and MASTERCARD SECURECODE® by Mastercard International Incorporated, Purchase, New York). By obtaining this additional factor from the suspect consumer, the likelihood of the suspect consumer being a fraudulent consumer is reduced. However, this extra step presents an interruptive inconvenience, a barrier, or an interference to at least some legitimate consumers and subsequently may cause at least some consumers to abandon legitimate payment transactions. These abandonments result in lost revenues to many parties, such as the merchant, the merchant acquirer, and the issuer. The systems and methods described herein address these problems and others described herein.

In the example embodiment, a cardholder registers with an adaptive authentication (AA) computer system for adaptive authentication services. In some cases, this may be done by downloading an app (computer code) onto a user device and registering with the app server. In other cases, registration with the AA computer system for authentication services may be initiated by and/or at the issuing bank. In some embodiments, use of adaptive authentication services by the AA computer system may be initiated by the merchant. In some embodiments, use of certain point-of-sale (POS) devices may require and/or initiate authentication using the AA computer system. In some embodiments, registration with the AA computer system includes receiving, by the AA computer device, a cardholder identifier, cardholder preferences including preferences related to one or more authentication types used for a particular merchant location and/or a payment transaction amount. Alternatively or additionally, registration with the AA computer system may include receiving, by the AA computer device, a generalized preference for a method of contact (e.g., a contact channel) and an authentication type applicable to any payment transaction situation. For example, upon registration with the AA computer system, a user may input their personal identification information, their cardholder identifier, and authentication type preferences. Subsequent interaction with the AA computer system may allow the user to reconfigure their authentication type preferences.

In the example embodiment, the AA computer system includes at least an adaptive authentication (AA) computer device. When a cardholder executes a transaction with a merchant, the AA computer device detects the pending payment transaction across a payment processing network, assesses whether the payment transaction may be fraudulent, and determines whether the cardholder has designated a preference of an authentication type to be used for authenticating the cardholder. If the payment transaction is determined to be potentially fraudulent and the cardholder has not designated a preferred authentication type, the AA computer system may prompt the user with a request for designating an authentication type to be used in the transaction and future similar transactions (e.g., the AA computer system will send a message to the user computer device for display). Upon receiving a response, the AA computer system will initiate an authentication using the user-designated authentication type to authenticate the cardholder and allow the payment transaction to be completed.

In some embodiments, the AA computer device determines whether an authentication is required by retrieving, from a database, historical payment transactions by the cardholder and, if an authentication occurred for the historical transaction, the respective authentication type used and the method of contact used. The AA computer device generates a model based on the historical payment transaction data. The model is then applied to the pending transaction to determine an authentication type to be used for the pending transaction.

In some embodiments, the cardholder provides preferred authentication types. For example, during registration the cardholder defines a preferred authentication type and a preferred method of contact. When a payment transaction is detected, the AA computer device generates the model based on the historical payment transaction data and modifies the model using the cardholder defined authentication type preferences. The model is then applied to pending payment transaction to determine the authentication type to use for the pending transaction.

In some embodiments, the AA computer device may prompt the cardholder to define a desired authentication type for a pending payment transaction. For example, when a payment transaction is detected, the AA computer device may cause the user device associated with the cardholder to display a dropdown menu including authentication types such as a pin number, a one-time password, or a security question. The cardholder selects, from the presented authentication types, an authentication type for the pending payment transaction. The AA computer device generates and/or refines a model including the historical data, defined cardholder authentication type preferences, and the selected authentication type. The cardholder is prompted to authenticate using the selected authentication type for the pending payment transaction and for future similar payment transactions.

In the example embodiment, if the AA computer device determines that the initial payment processing transaction is potentially fraudulent or just by merely receiving the initial payment processing transaction, the AA computing device transmits an authentication request (e.g., in the form of at least one question and/or at least a request for an authentication code) to the user computer device to authenticate the suspect cardholder to determine whether the suspect cardholder is the actual cardholder. In another embodiment, the AA computing device includes a risk-based decisioning (RBD) component or is in communication with a RBD component that evaluates the payment transaction being initiated and generates a risk score for the transaction indicating how likely the transaction is fraudulent. In one embodiment, the risk score is based, at least in part, on a history of payment transactions and whether the suspect cardholder has engaged in previous, similar transactions with the merchant. In some cases, the RBD component may score the transaction as a low fraud risk (e.g., if there is a long history of similar transactions between the merchant and suspect cardholder, etc.) in which case the AA computer device may approve the transaction without any further authentication steps. For example, the RBD component may identify one or more pieces of information about the transaction that are used to "score" the transaction for risk (e.g., potential fraud). More specifically, the RBD component may score the transaction based on several aspects including device information, account information, and characteristics of the transaction such as location, amount, and the like. In other cases, the RBD component may score the transaction as a high fraud risk, and thus, may initiate the authentication where at least one question is directed to the suspect cardholder to further authenticate.

For example, an authentication challenge may be provided by an authentication service such as a 3-D SECURE® protocol (3DS) (e.g., EMV® 3-D Secure by EMVCo., LLC.; Verified by Visa by Visa International Service Association, Delaware; and MASTERCARD SECURECODE® by Mastercard International Incorporated, Purchase, New York). This extra step of presenting a challenge question to the suspect cardholder is to help confirm that they are the legitimate cardholder associated with the account and account number presented. The AA computing device receives input (e.g., an account identifier/number associated with the payment account, a zip code associated with the payment account, a PIN number, a password, a code transmitted to the user, etc.) via a POS, user computer device, or phone in response to the challenge. Based on the challenge response, the AA computer device determines whether the user is associated with the cardholder account and transmits an authentication response based on the determination to the merchant/issuer.

In some embodiments, device information may be evaluated such as information about the computing device used during the transaction, a unique hardware identifier, or an IP address associated with the device, etc. Account information may include information about the account being used, such as dates of use, name on the account or address associated with the account, etc. Characteristics of the transaction may include, for example, dollar amounts, a history of regular, repeated transactions between the merchant and cardholder, and a history of fraudulent transactions at the merchant and/or with the cardholder. In one embodiment, the RBD component generates a risk score for the transaction based on the device information, account information and/or matching information used for the transaction. The RBD component may then send the score and/or risk-based decisioning data to an issuer's access control system (ACS) for further consideration. Using this score and/or risk-based data, the issuer's ACS may then determine whether or not the suspect consumer should be further authenticated (e.g., through the 3DS "step-up" challenge) or whether the transaction can be verified without further authentication. In addition, the RBD component may provide the score to the AA computer device so it can factor it into the authentication type used for a particular transaction. In other words, if a transaction is scored as a high risk transaction by the RBD component, the AA computer device may take this score into account when determining the authentication type to be used to authenticate the cardholder. In those cases where the AA computer device authenticates the cardholder, the ACS or the issuer may not have to perform an authentication but rather may utilize the authentication process provided by the AA computer device.

In the example embodiment, a cardholder engages in a payment transaction at a merchant location. In other embodiments, the cardholder may engage in a payment transaction online, through a website, and/or through another card-not-present payment transaction. The AA computer system will receive payment transaction data for the pending payment transaction. In some embodiments, the AA computer system may monitor a payment transaction processing network for transactions being processed over the network. In some embodiments, the AA computer system may receive payment transaction data from a merchant. The payment transaction data may include a cardholder identifier for the cardholder executing the payment transaction. The payment transaction data may also include a merchant location. The payment transaction data may also include a transaction amount. In some embodiments, the payment transaction data may also include other information related to the particular product or service associated with the transaction (e.g., the product or service category, features or characteristics of the product such as the size, frequency of fraudulent transactions associated with the particular product or service, etc.).

In the example embodiment, the AA computer system builds a model using historical transaction data and the corresponding authentication types used for those historical transactions and then may modify the model based on retrieved cardholder preferences. In the example embodiment, the cardholder registers with AA computer system and stores authentication preferences defining the authentication type to be used during a transaction. Alternatively, the cardholder may be prompted while transactions are occurring for their preferences of authentication types. The authentication type may be dependent on the type of transaction. For example, the cardholder may desire heightened authentication type(s) for transactions involving jewelry or high dollar amounts (e.g., $10,000, $50,000, $100,000, etc.). In other cases, the cardholder may desire heightened authentication types based on other factors such as payment transaction location, time of day, distance from home, and frequency of purchases at the particular merchant. In addition, the cardholder may define specific preferred authentication types for the above described scenarios (e.g., PIN, password, biometric scan, etc.). In the example embodiment, the cardholder also defines preferred methods of communication (e.g., text message, email, telephone call, a website, an app on a user device, etc.). In some embodiments, the cardholder may prefer a specific method of communication for transactions having certain variables. For example, the cardholder may prefer a telephone call for high dollar payment transactions and a text message for low dollar payment transactions. In other cases, the cardholder may prefer a telephone call based on geographical location and/or merchant type and/or category.

In some embodiments, the cardholder may not have executed any payment transactions at the particular merchant location and thus, the model may need further refining to better determine the authentication type desired by the cardholder. In such embodiments, the AA computer device may be configured to request or prompt the cardholder to provide input indicating the authentication type desired by the cardholder for a transaction at the particular merchant location by causing an input screen to be displayed on a user device of the cardholder and/or the POS. In other embodiments, the AA computer device may initiate an authentication request (e.g., request the cardholder to respond to an authentication type) using an existing cardholder preference configuration including a method of contact. Alternatively or additionally, the authentication request may also be based on the particular transaction amount.

An alternate means of implementing the AA computer system may be to initiate an authentication request using a particular authentication type based on authentication types used by other similar cardholders at that particular merchant. In some embodiments, the particular authentication type may be dependent on the average transaction amount at the merchant. Aggregated data may be related to cardholders by categories such as a cardholder being within a "home" district, frequency of visit, and/or average transaction amount, etc. The aggregated data may be used to determine an initial authentication type for the current cardholder awaiting authentication for the pending transaction. In some embodiments, data from other similar cardholders may be used at similar merchants at different locations. For example, a chain store in another state may use the same authentication type (e.g., one-time pass, PIN, signature, biometric, etc.) despite varying locations.

In some embodiments, the AA computer device may not have an initial cardholder's preferred method of contact stored for the particular merchant location, payment transaction value range, and/or defined method of contact preferences. In other embodiments, the AA computer device may not have stored an initial cardholder's preferred method of contact associated with the particular merchant location. In other embodiments, the AA computer device may not have stored an initial cardholder's preferred method of contact associated with the particular payment amount and/or payment threshold. In these embodiments, and/or in cases where certain initial values are absent, the AA computer device may initiate an authentication request using a default method of contact (e.g., by a telephone call, text message, and/or prompt on a user device). In some embodiments, the default method of contact may include contact information received upon registration by the cardholder to the AA computer device. For example, the AA computer device may initiate an authentication via a telephone number registered by the cardholder. In some embodiments, the default method of contact may include contact information retrieved from an issuer associated with the cardholder identifier.

In other embodiments, the AA computer device may not have stored an initial cardholder's preference for an authentication type to be used at the particular merchant location and/or for the particular payment transaction amount. In such embodiments, and/or in cases where certain initial values are absent, the AA computer device may initiate an authentication type using a default authentication type. The default authentication type may include an authentication type based on the initial registration. The default authentication type may also be determined using authentication types used by other cardholders at the same merchant location. In some embodiments, the default authentication type may be based on an evaluation of other factors such as past fraudulent activity at the merchant location, fraudulent activity in the geographical area, fraudulent activity associated with the cardholder, fraudulent activity above and/or below certain payment amounts, fraudulent activity associated with certain products or services, cardholder convenience of authentication types, effectiveness of authentication types, cardholder convenience of methods of communication, cardholder response rates associated with specific methods of communication and/or authentication types. Additionally or alternatively, the AA computer device may be configured to request the cardholder preferences for the authentication type used for the particular payment transaction and/or future similar transactions.

In some embodiments, the history of authentication types used may be a subset of the retrieved histories of authentication types used by the cardholder. For example, the historical authentication data may be filtered to include only payment transactions for payment amounts above a threshold (e.g., payment transactions above $100, $500, $1000, etc.). In some embodiments, the history data may be organized by category (e.g., merchant type, large appliances, computers, audio equipment, groceries, restaurants, etc.). In some embodiments, the history data may be filtered by geographical location. For example, payment transactions executed within a certain radius (e.g., 20 miles) of a home or resident location associated with a cardholder. If a cardholder is engaging in purchases within a certain geographical radius of known trusted merchants, a simpler authentication type or no authentication may be preferred by the cardholder. If a cardholder is outside a certain geographical radius, heightened authentication types (e.g., biometric, telephone call, etc.) may be preferred by the cardholder. In some embodiments the cardholder may configure a "home" location defining a geographical area in which the cardholder may have a higher level of trust. The system and process described herein allows the cardholder to designate or the system determines from prior transactions the authentication type used to authenticate the suspect cardholder initiating the transaction.

In other embodiments, the historical transaction data may be organized by merchant. For example, the historical data used to generate the model may be limited to payment transactions involving authentications at a particular retail chain or particular fast food restaurant. For example, an authentication type used at a fast food establishment in one location may also be used at the same fast food establishment in different location. In another embodiment, the historical data may be limited to authentication types by other cardholders further limited by characteristics of the other cardholders (e.g., income level, frequency of transactions, history of fraudulent activity, home or resident location, etc.). For example, authentication types for individuals engaging in a high volume of transactions may use a faster form of authentication. In some embodiments, the historical data may include only authentication types selected by the cardholder in response to a prompt to select an authentication type during a transaction, or by authentication type selections by other cardholders in response to a prompt to select an authentication type at the particular merchant location.

In some embodiments, the historical data may be organized by time. For example, authentication types before a certain date may be removed or may be assigned less weight. More recently recorded authentication types may therefore be of a greater weight in subsequent analysis, for example, in a moving average. A moving average, for example, may more accurately capture changing authentication preferences by the cardholder. For example, as a cardholder becomes more familiar with a merchant, there may an increased level of trust. Subsequent transactions may therefore require only minimal authentication types such as a PIN or password, or no further authentication at all. In other cases, a cardholder may detect changes in a merchant that may warrant additional security measures. In such cases, the cardholder may desire additional and/or more secure authentication types.

In some embodiments, the AA computer system may not have stored a history of authentications for the cardholder. In such embodiments, the AA computer device may be configured to generate a default model representing the historical behavior of other cardholders. In some embodiments, the default model may be determined by analyzing a history of authentications performed by other cardholders at the particular merchant location (e.g., using an average, median, moving average, statistical analysis, probability distribution, etc.) as described above. In some embodiments, the analysis may include analyzing the authentication types associated with a particular payment amount and/or a payment threshold. For example, the model may include, in part, evaluation of payment transactions above a certain threshold (e.g., $500, $1000, etc.) and the associated authentication types selected by the AA computer system when the threshold is exceeded. In some embodiments, the default model may include evaluation of other factors such as past fraudulent activity at the merchant location, fraudulent activity in the geographical area, fraudulent activity associated with the cardholder, fraudulent activity above and/or below certain payment amounts, fraudulent activity associated with certain products or services, cardholder convenience of authentication types, effectiveness of authentication types, cardholder convenience of methods of communication, cardholder response rates associated with specific methods of communication and/or authentication types.

In the example embodiment, the AA computer device may generate a model based on the history of authentication types used during payment transactions. The execution of a simulation of the model provides a dynamic prediction of an authentication type preferred by the cardholder, personalized to the cardholder. A model generated by the AA computer device may also be unique to the merchant location and/or the payment transaction amount. In some embodiments, the model may be further personalized to the cardholder associated with the payment transaction by analyzing other factors such as past fraudulent activity at the merchant location, fraudulent activity in the geographical area, fraudulent activity associated with the cardholder, fraudulent activity above and/or below certain payment amounts, fraudulent activity associated with certain products or services, cardholder convenience of authentication types, effectiveness of authentication types, cardholder convenience of methods of communication, cardholder response rates associated with specific methods of communication and/or authentication types. The model may further be modified by including aggregated data from other cardholders. The aggregated data may be organized by categories and/or demographic characteristics (e.g., income level, geographical home or residential location, etc.). The aggregated data may be organized by parameters associated with payment transactions such as frequency of engaging in payment transactions, payment amounts, frequency of fraudulent activity, etc. In the example embodiment, the AA computer device may assign a score to an authentication type. A higher score may indicate a greater likelihood of preference by the cardholder.

In the example embodiment, the cardholder may be presented with alternative and/or additional authentication types. In some embodiments, the selected authentication type may by stored by the AA computer device. If a cardholder selected authentication type deviates from the generated model. The AA computer device may alter the authentication type used for transactions at the merchant location and/or for the particular payment transaction amount based on deviations from the generated model. In some embodiments, the cardholder may update and/or configure the preferences for the particular merchant location and/or particular payment transaction amount. The AA computer device may then update or revise the model according to the updated preferences. In some embodiments, a cardholder may update and/or define a generalized or default authentication type applicable to any merchant location (e.g., authenticate the cardholder using a PIN for all purchase at merchant "A") and/or payment transaction amount (e.g., use authentication type "A" for any purchases over $100). In some embodiments, a merchant and/or issuer may require a particular authentication type and/or a method of contact. For example, in locations of high fraudulent activity, a merchant may require heightened authentication types. In some embodiments, the cardholder and/or merchant and/ or issuer may determine a type of authentication type using a minimum threshold based on the scoring system described above.

In the example embodiment, the cardholder may engage in frequent payment transactions with a particular merchant (e.g., a supermarket, gas station, restaurant, etc.). The cardholder may configure a preferred authentication type for payment transactions executed at the particular merchant. For example, the cardholder may select a preferred authentication type of a PIN number for the particular merchant. Repeated payment transactions executed at the merchant will thereafter request a PIN number. In some embodiments, the cardholder may engage in a transaction at a nearby, but similar, merchant. In this embodiment, the AA computer device may generate a model based on the previous payment transactions executed by the cardholder at the particular merchant. The model may include the frequency of the payment transactions for analysis. In some embodiments, the model may include the payment transaction amounts for analysis in addition to the frequency of transactions. The AA computer system may then initiate an authentication for the payment transaction at the similar merchant requiring a PIN number without prompting the cardholder for an authentication type. In some embodiments, the AA computer system may initiate an authentication using a more secure authentication. For example, if the AA computer device determines that the payment transaction amount deviates from the model, a more secure and/or additional authentication types may be initiated for payment transactions executed at the similar merchant (e.g., biometric input). In some embodiments, the AA computer device may determine that the current transaction deviates from a computed expected frequency defined by the model and may then also initiate a more secure and/or additional authentications at the similar merchant.

In the example embodiment, the AA computer device monitors transactions on a payment processing network. The AA computer device detects a payment transaction, dynamically determines an authentication type and transmits to the cardholder associated with the payment transaction, a request for authentication using the preferred method of contact. In this manner, the merchant and/or cardholder need not initiate communication with the AA computer system to determine the cardholder's preferred authentication type. In other embodiments, the cardholder may pre-authenticate or otherwise initiate an authentication prior to engaging in a transaction.

In some embodiments, machine learning techniques further determine an authentication type. A processor or a processing element may be trained using supervised or unsupervised machine learning, and/or the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs. In the example embodiment, the machine learning inputs are historical payment transactions performed by the cardholder.

Additionally or alternatively, the machine learning programs may be trained by inputting sample data sets or certain data into the programs, such as images, user computing device data, location data, human behavioral data, activity data, and/or consumption data. In these embodiments, historical transactions from other cardholders may be used. The machine learning programs may also utilize deep learning algorithms that may be primarily focused on pattern recognition, and may be trained after processing multiple examples. In some embodiments, the machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided, the processing element may, based upon the discovered rule, accurately predict the correct output. For example, cardholder-defined preferences may be input by the cardholder that defines authentication types for various circumstances (e.g., transaction amount, merchant location, etc.). In unsupervised machine learning, the processing element may be required to find its own structure in unlabeled example inputs. In one embodiment, machine learning techniques may be used to extract data about the cardholder, merchant, user computing device, transaction details, geolocation information, image data, and/or other data.

Based upon these analyses, the processing element may learn how to identify characteristics and patterns that may then be applied to analyzing authentication data, payment transaction data, merchant data, user computing device data, and/or other data. For example, the processing element may learn, with the user's permission or affirmative consent, to identify the cardholder's preferred authentication type for various circumstances. The processing element may also learn how to identify different types of routes and/or driver behaviors and/or user preferences based upon differences in the received sensor data.

In the example embodiment, the cardholder data and history of authentications are anonymized and aggregated (e.g., by the payment processing network and/or social media servers, etc.) prior to receipt by the AA computing device (e.g., no personally identifiable information (PII) is received by the AA computing device). In other embodiments, the AA computing device may be configured to receive a history of authentications at a particular merchant that are not yet anonymized and/or aggregated, and thus may be configured to anonymize and aggregate the authentication data. In such embodiments, any PII received by the AA computing device is received and processed in an encrypted format, and/or is received with the consent of individuals and/or merchants with which the PII is associated. In situations where the systems discussed herein collect personal information about individuals including users and/or merchants, or may make use of such personal information, such individuals may be provided with an opportunity to control whether such information is collected or whether and/or how such information is used. For example, individuals and/or merchants may receive notification of the use of certain data. Alternatively or additionally, individuals and/or merchants may choose to exempt their data from use by the computer system (e.g., opt out). Alternatively or additionally, certain data may be processed in one or more ways before it is stored or used, so that personally identifiable information is removed.

At least one of the technical problems addressed by this system includes: (i) determining multi-level security measures based on multiple factors; (ii) determining unique authentication procedures based on user data; (iii) determining unique authentication procedures based on historical data; and (iv) implementing adaptive authentication protocols.

The methods and system described herein may be implemented using computer programming or engineering techniques including computer software, firmware, hardware, or any combination or subset. As disclosed above, at least one technical problem with prior systems is that there is a need for enhanced payment transaction authentication. The system and methods described herein address that technical problem by using a user-configurable authentication system. The system dynamically determines the context of a payment transaction to adapt authentication types to cardholder preferences.

A technical effect of the systems and processes described herein is achieved by performing at least one of the following steps: (i) detecting a payment transaction; (ii) retrieving cardholder defined preferences; (iii) retrieving a history of authentications; (iv) generating a model representing the preferred authentication type of the cardholder; (v) determining, using the model, an authentication type for the pending transaction; and (vi) initiating at least one authentication request with the determined authentication type using the preferred method of contact.

The resulting technical benefits achieved by the systems and methods of the disclosure include at least one of: (i) more effective identification of fraudulent transactions; (ii) improved prevention of fraud; (iii) improved identification of parties engaging in payment transactions; (iv) customized authentication types for each merchant and cardholder; (v) improved efficiency of authentication systems; (vi) reduced messaging across payment processing networks; (vii) more efficient use of data bandwidth; (viii) reduced use of hardware and software systems for fraud detection due to more effective fraud detection.

Described herein are computer systems such as adaptive authentication computer devices. As described herein, such computer systems include at least one processor and at least one memory device. However, any processor in a computer device referred to herein may also refer to one or more processors wherein the processor may be in one computer device or a plurality of computer devices acting in parallel. Additionally, any memory device in a computer device referred to herein may also refer to one or more memories wherein the memories may be in one computer device or a plurality of computer devices acting in parallel.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, a "processor" may include any programmable system including systems using microcontrollers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term processor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, ORACLE® Database, MySQL, IBM® DB2, MICROSOFT® SQL Server, SYBASE®, and PostgreSQL.

However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In some embodiments, a computer program is provided, and the program is embodied on a computer readable medium. In an exemplary embodiment, the program is executed on a single computer system, without requiring a connection to a sever computer. In at least one embodiment, the program is run in a WINDOWS® environment (Windows is a registered trademark of Microsoft Corporation, Redmond, Wash.). In another embodiment, the program is run on a mainframe environment and a UNIX® server environment (UNIX is a registered trademark of X/Open Company Limited located in Reading, Berkshire, United Kingdom). In these examples, the program is flexible and designed to run in various different environments without compromising any major functionality. In some embodiments, a system includes multiple components distributed among a plurality of computer devices. One or more components may be in the form of computer-executable instructions embodied in a computer-readable medium. The systems, processes, and programs are not limited to the specific embodiments, described herein. In some embodiments, system or process components can be practiced independently and separately from other components and processes described herein. Each component and process can also be used in combination with other assembly packages and processes.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

As used herein, the term "payment network" refers to a system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, crypto-currency (e.g., Bitcoin) etc. Examples of networks or systems configured to perform as payment networks include those operated by MASTERCARD®, VISA®, DISCOVER®, AMERICAN EXPRESS®, PAYPAL®, etc. Use of the term "payment network" herein may refer to both the payment network as an entity, and the physical payment network, such as the equipment, hardware, and software comprising the payment network.

As used herein, the term the terms "real time" refers to substantially simultaneous or near instantaneous transfer of information. The information transfer may pertain specifically to processing payment transactions or generally to data transmitted from one component and received by a second component. The transfer of information may be executed across a network or internally within a system. In the embodiments described herein, the time it takes to process a payment card transaction is executed in real-time. The time period, for processing payment transactions, is measured in seconds or in some cases, less than seconds (milliseconds).

The systems and processes are not limited to the specific embodiments, described herein. In addition, components of each system and each process can be practiced independent and separate from other components and processes described herein. Each component and process also can be used in combination with other assembly packages and processes.

The following detailed description illustrates embodiments, of the disclosure by way of example and not by way of limitation. It is contemplated that the disclosure has general application to the development and sale of financial instruments associated with a financial analytics of a geographical sector.

FIG. 1 is a schematic diagram illustrating an adaptive authentication (AA) computer system 100 including an AA computer device 110 in communication with a multi-party payment card processing system in accordance with one embodiment of the present disclosure. Embodiments, described herein may relate to a payment card processing system, such as a credit card payment system using the MASTERCARD® interchange network. The MASTERCARD® interchange network is a set of proprietary communications standards promulgated by Mastercard International Incorporated for the exchange of financial transaction data and the settlement of funds between financial institutions that are members of Mastercard International Incorporated. (MASTERCARD® is a registered trademark of Mastercard International Incorporated located in Purchase, New York).

In the payment card processing system, a financial institution called the "issuer" issues a transaction card or electronic payments account identifier, such as a credit card, to a consumer or cardholder 120, who uses the transaction card to tender payment for a purchase from a merchant 130. To accept payment with the transaction card, merchant 130 establishes an account with a financial institution that is part of the financial payment system. This financial institution may be called a "merchant bank," 140, an "acquiring bank," or an "acquirer." When cardholder 120 tenders payment for a purchase with a transaction card, merchant 130 requests authorization from a merchant bank 140 for the amount of the purchase. The request may be performed over the telephone, but may also be performed through the use of a POS terminal, which reads cardholder's 120 account information from a magnetic stripe, a chip, or embossed characters on the transaction card and communicates electronically with the transaction processing computers of merchant bank 140. Alternatively, merchant bank 140 may authorize a third party to perform transaction processing on its behalf. In this case, the POS terminal will be configured to communicate with the third party. Such a third party may be called a "merchant processor," an "acquiring processor," or a "third party processor."

Using payment processor 150, computers of merchant bank 140 or merchant processor will communicate with computers of an issuer bank 160 to determine whether cardholder's 120 account 170 is in good standing and whether the purchase is covered by cardholder's 120 available credit line. Based on these determinations, the request for authorization will be declined or accepted. If the request is accepted, an authorization code is issued to merchant 130.

In the example embodiment, the payment processing network is in communication with adaptive authentication (AA) computer device 110, and AA computer device 110 is configured to determine authentication types for cardholder 120 and initiate an authentication request before the issuer authorizes the transaction. Alternately or additionally, AA computer device 110 may monitor payment processor 150 for payment transactions associated with registered cardholder 120. AA computer device 110 may retrieve cardholder preferences for cardholder 120. AA computer device 110 may also retrieve a history of authentications performed by cardholder 120 and/or authentication types selected by cardholder 120 when prompted. AA computer device 110 generates a model using at least the history of authentications. The model represents optimal authentication types for cardholder 120 over a period of time (e.g., 3 months, 6 months, 1 year, etc.). The AA computer device determines an authentication type and initiates at least one authentication request for the determined authentication type using a preferred communication method defined by cardholder 120.

In one embodiment, AA computer device 110 is configured to receive cardholder preferences input by the cardholder through, for example, a user device, wherein the user preferences include different authentication types preferred by the cardholder for authenticating a user of cardholder account 170 as the legitimate cardholder during a payment transaction initiated by the user.

In some embodiments, AA computer device 110 is configured to retrieve cardholder authentication preferences input by cardholder 120 and is further configured to use machine learning and artificial intelligence to generate a model for cardholder 120. The model may be simulated to determine which authentication type to use in various circumstances such that AA computer device 110 is able to authenticate cardholder 120 using the authentication type that cardholder 120 prefers for each type of purchases.

In another embodiment, AA computer device 110 retrieves merchant 130 preferences for authentication of a user of a cardholder account 170. Merchant 130, using a website or a user computer device, may configure preferred authentication types that in some embodiments may override the preferences of cardholder 120. In a further embodiment, issuer bank 160 or merchant bank 140 may require certain authentication types for certain transactions. High dollar items, for example, may require heightened authentication types. AA computer device 110 may receive from issuer bank 160 or merchant bank 140 configuration preferences for authentication types. In other embodiments, other institutions, such as governments, universities or businesses, may require certain authentication types for certain payment transactions. For example, a university operating a restaurant or bookstore for students may use an independent payment processing network utilizing specialized payment types such as credits or meal points. In another example, a business issuing payment cards to employees for business purchases may configure AA computer device 110 with preferred authentication types for all business transactions. In another embodiment, AA computer device 110 may be configured to prompt cardholder 120 for a preferred authentication type. In some embodiments, AA computer device 110 may prompt cardholder 120 to inquire if the most recent authentication type was desirable.

In some embodiments, cardholder 120 may communicate directly with AA computer device 110 to configure cardholder preferences including at least authentication preferences and preferred communication methods. Cardholder 120 may store a preferred authentication type for a particular merchant, group of merchants, or category of merchants. Alternatively or additionally, cardholder 120 may configure a preferred authentication type based on payment transaction amounts. AA computer device 110 may also store a preferred method of communication to receive and respond to authentications initiated by AA computer device 110.

When a request for authorization is accepted, the available credit line of cardholder's 120 account 170 is decreased. Normally, a charge for a payment card transaction is not posted immediately to cardholder's 120 account 170 because bankcard associations, such as Mastercard International Incorporated®, have promulgated rules that do not allow merchant 130 to charge, or "capture," a transaction until goods are shipped or services are delivered. However, with respect to at least some debit card transactions, a charge may be posted at the time of the transaction. When merchant 130 ships or delivers the goods or services, merchant 130 captures the transaction by, for example, appropriate data entry procedures on the POS terminal. This may include bundling of approved transactions daily for standard retail purchases. If cardholder 120 cancels a transaction before it is captured, a "void" is generated. If cardholder 120 returns goods after the transaction has been captured, a "credit" is generated. Payment processor 150 and/or issuer bank 160 stores the transaction card information, such as a category of merchant, a merchant identifier, a location where the transaction was completed, amount of purchase, date and time of transaction, in a database 240 (shown in FIG. 2).

After a purchase has been made, a clearing process occurs to transfer additional transaction data related to the purchase among the parties to the transaction, such as AA computer device 110, merchant bank 140, payment processor 150, and issuer bank 160. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, AA computer device 110 stores data including at least the preferred authentication type and the preferred communication method. In the example embodiment, when cardholder 120 purchases a product or service, at least a portion of the payment transaction information is transmitted to AA computer device 110 during the clearance process as transaction data. When payment processor 150 receives the payment transaction information, payment processor 150 routes the information to database 240.

For debit card transactions, when a request for a personal identification number (PIN) authorization is approved by the issuer, cardholder's account 170 is decreased. Normally, a charge is posted immediately to cardholder's account 170. The payment card association then transmits the approval to the acquiring processor for distribution of goods/services or information, or cash in the case of an automated teller machine (ATM).

After a transaction is authorized and cleared, the transaction is settled among merchant 130, merchant bank 140, and issuer bank 160. Settlement refers to the transfer of financial data or funds among merchant's 130 account, merchant bank 140, and issuer bank 160 related to the transaction. Usually, transactions are captured and accumulated into a "batch," which is settled as a group. More specifically, a transaction is typically settled between issuer bank 160 and payment processor 150, and then between payment processor 150 and merchant bank 140, and then between merchant bank 140 and merchant 130.

In some embodiments, cardholder 120 registers one or more payment cards with a digital wallet. Having done this, cardholder 120 can interact with a participating merchant 130. At the check-out stage, merchant 130 displays a button on the merchant website which cardholder 120 can click on in order to make a payment using the cardholder's digital wallet. Merchant 130 then redirects the user to a "switch" operated by payment processor 150. Using a cookie, or other identifier, located on the cardholder's computer, the "switch" is able to determine which wallet-hosting server hosts a wallet associated with cardholder 120. The switch then establishes a connection between the cardholder's computer and the appropriate wallet-hosting system, which presents cardholder 120 with a sign-in page (e.g., as a pop-up window), where there is an authentication process (e.g., entry of a pre-agreed password). This log-in process may use the same login credentials (e.g., password) which the user also uses to obtain access to other online banking activities. In some embodiments, the authentication process may be determined by the AA computer device 110 as described elsewhere herein.

The wallet-hosting system then securely transfers the cardholder's payment information to the online merchant's domain. The merchant's domain submits the cardholder's payment information to merchant bank 140 for a separate authorization process in which the acquiring domain communicates with the issuing bank 160 to ask the bank to authorize the transaction. Thus, cardholder 120 is not required to enter card details (except at the stage of initially registering with the wallet-hosting system), and the online transaction process is streamlined with only a single redirection, and consistent branding for the entire payment process, irrespective of the merchant 130.

In some embodiments, a unique identifier is provided to cardholder 120. The unique identifier is different from the cardholder's account number. In these embodiments, payment processor 150 stores the unique identifier in database 240 (shown in FIG. 2) along with cardholder account 170. When payment processor 150 receives the unique identifier, payment processor 150 determines the associated cardholder account 170 and uses that information in processing the payment transaction.

Figure 2:
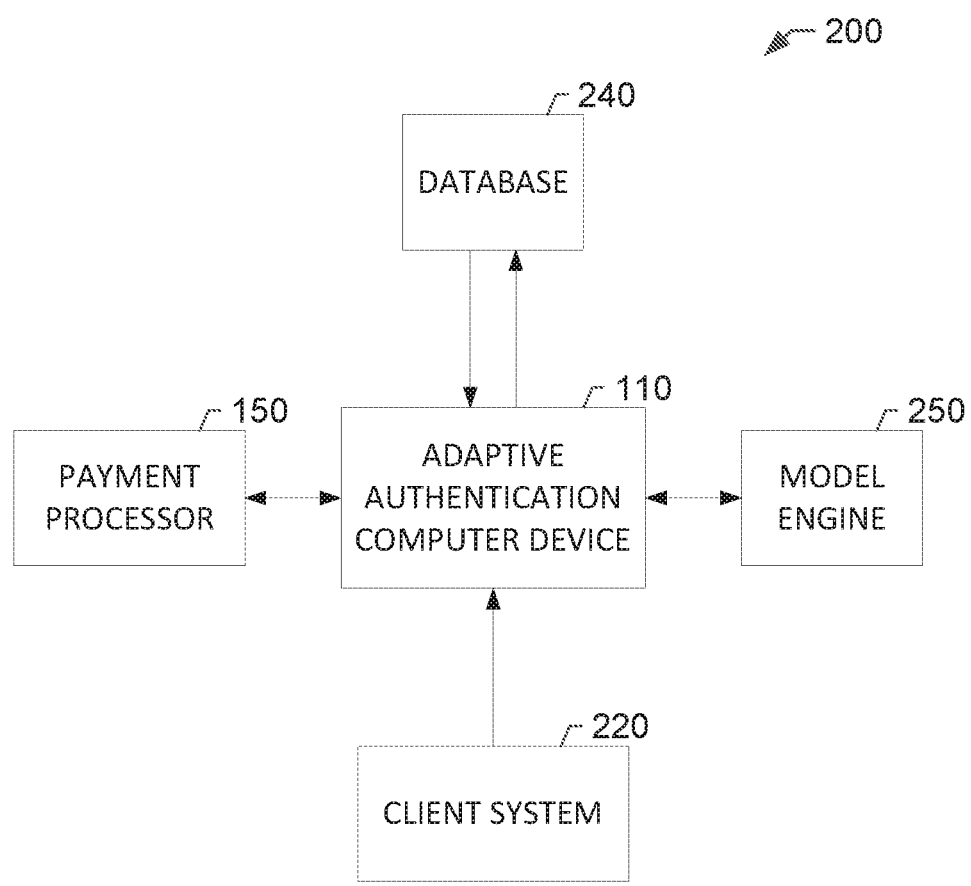

FIG. 2 is a simplified block diagram 200 of the example adaptive authentication (AA) computer system 100 shown in FIG. 1 in communication with example components used for adaptive authentication, in accordance with one embodiment, of the present disclosure. In the example embodiment, diagram 200 includes the AA computer device 110 in communication with payment processor 150, a client system 220, a database 240, and a model engine 250 for generating authentication preferences for cardholder 120 (shown in FIG. 1).

In the example embodiment, client system 220 may be communicatively coupled to AA computer device 110 for registration and configuration of the AA computer device 110. Cardholder 120 may input authentication preferences for particular merchants, categories, and dollar amounts. AA computer device 110 stores the preferences in database 240. When a payment transaction is detected on payment processor 150, AA computer device 110 retrieves authentication preferences from database 240 for cardholder 120. Additionally or alternatively, if cardholder 120 has a history of transactions, AA computer device 110 retrieves the history of transactions from 240 for cardholder 120. In some embodiments, AA computer device 110 may retrieve a history of transactions for the merchant (or similar merchants). AA computer device 110 transfers the data to model engine 250 for processing. Model engine 250 generates a model using the data as described herein. The model may then be executed and/or simulated to determine an authentication type to authenticate cardholder 120 for the pending transaction.

Figure 3:
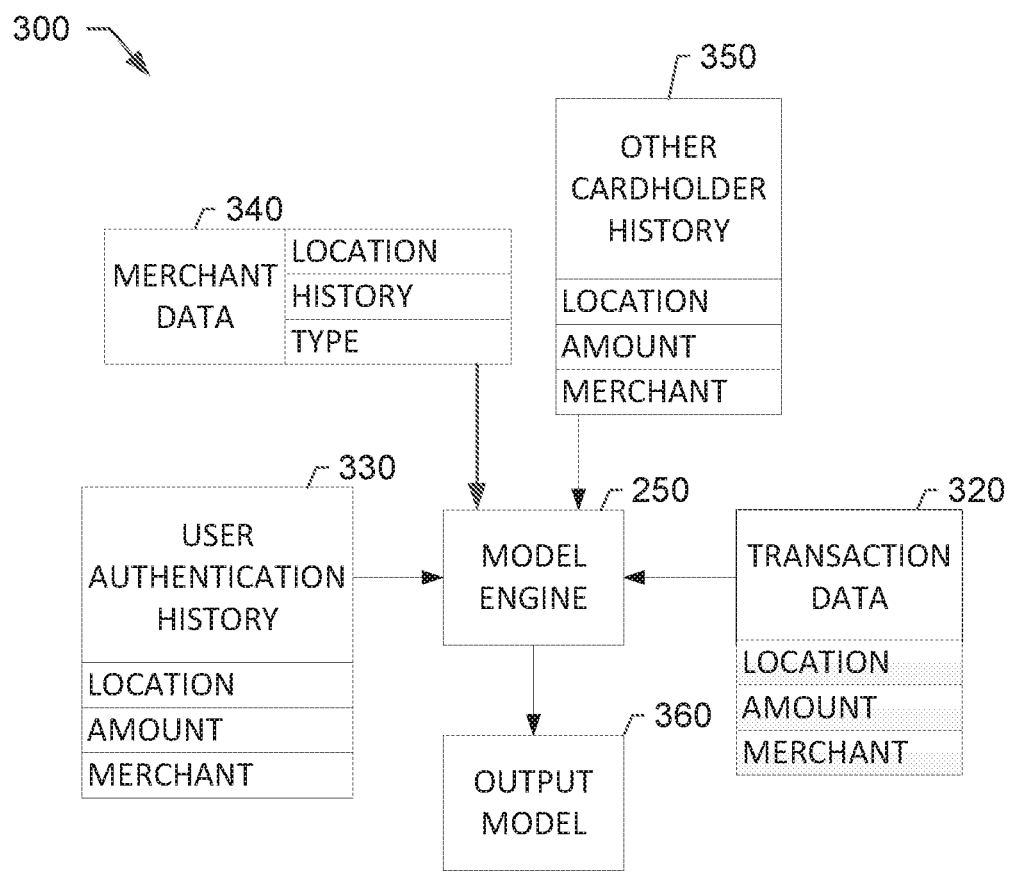

FIG. 3 is a simplified block diagram 300 of an example model engine 250 for generating an output model to dynamically determine an authentication type in accordance with one embodiment of the present disclosure. In the example embodiment, diagram 300 includes model engine 250, transaction data 320, user authentication history 330, merchant data 340, and other cardholder history 350. Model engine 250 generates an output model 360. In the example embodiment, transaction data 320 is received from payment processor 150 (shown in FIG. 1). In some embodiments, transaction data 320 may be received from other networks or from devices or systems communicatively coupled to the AA computer system 100 (shown in FIG. 1). In the example embodiment, transaction data 320 includes at least location information of the payment transaction, a dollar amount for the payment transaction, and merchant data associated with the payment transaction. In the example embodiment, model engine 250 retrieves user authentication history 330 data. User authentication history 330 data includes at least a history of payment transactions at the same merchant and at the same location by cardholder 120. In the example embodiment, model engine 250 also retrieves other cardholder history 350 data for past payment transactions at the same merchant location by other cardholders. Other cardholder history 350 data includes at least the location information, merchant data, and payment transaction amounts. In the example embodiment, model engine 250 also retrieves merchant data 340 associated with the merchant engaged in the current payment transaction. Merchant data 340 may include at least the location information, a history of payment transactions, and the type of merchant. In the example embodiment, model engine 250 generates a model using at least the above described data sets to produce output model 360.

Figure 4:
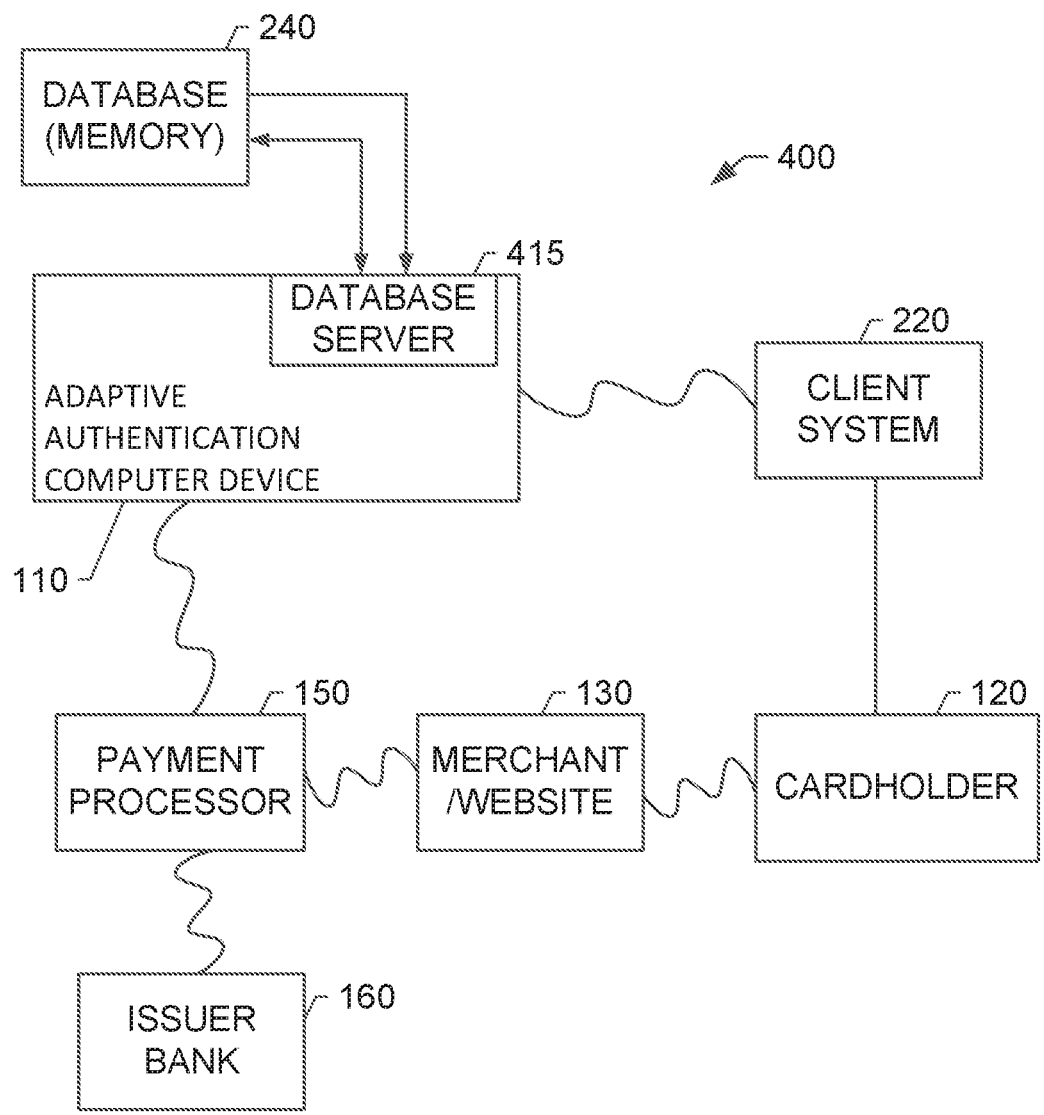

FIG. 4 is a simplified block diagram of an example embodiment of the AA computer system 100, designated AA computer system 400, that may be used for enhancing user authentication for payment card transactions. In the example embodiment, AA computer system 400 may be used for performing payment-by-card transactions received as part of processing cardholder transactions. In addition, AA computer system 400 includes a payment processing system that is in communication with AA computer device 110 configured to enhance user authentication similar to the system shown in FIG. 1. As described below in more detail, AA computer device 110 is configured to at least store a plurality of user preferences associated with a user account such as cardholder account 170; receive and store historical payment transaction and authentication data; determine one or more authentication types based, at least in part, on the user preferences and/or the historical data; transmit, using a cardholder-defined method of communication, the one or more authentication types to be presented to a user attempting to access the user account and/or engage in a payment transaction; and determine whether to authenticate the user based on a response to the one or more authentication requests.

In the example embodiment, client systems 220 (shown in FIG. 2) are computers that include a web browser or a software application to enable client systems 220 to access AA computer device 110 using the Internet. More specifically, client systems 220 are communicatively coupled to the Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. Client systems 220 can be any device capable of accessing the Internet including, but not limited to, a desktop computer, a laptop computer, a personal digital assistant (PDA), a cellular phone, a smartphone, a tablet, a phablet, or other web-based connectable equipment. In the example embodiment, cardholder 120 uses client system 220 to register for an enhanced authentication service, define preferred authentication types, and define preferred methods of communication.

A database server 415 communicatively couples AA computing device 110 to a database 240 that stores data. In one embodiment, database 240 includes at least user preferences, authentication types, issuer preferences, and/or merchant preferences. In the example embodiment, database 240 is stored remotely from AA computer device 110. In some embodiments, database 240 is decentralized. In the example embodiment, a person can access database 240 via client systems 220 by logging onto AA computer device 110 to configure cardholder preferences, as described herein.

AA computer device 110 is communicatively coupled with payment processor 150. Payment processor 150 represents one or more parts of a multi-party payment card processing system such as AA computer system 100 (shown in FIG. 1). In the example embodiment, AA computer device 110 is in communication with one or more computer devices associated with payment processor 150. In other embodiments, AA computer device 110 is in communication with one or more computer devices associated with merchant 130, merchant bank 140 (shown in FIG. 1), or issuer bank 160. In some embodiments, AA computer device 110 may be associated with, or is part of AA computer system 100, or in communication with AA computer system 100. In other embodiments, AA computer device 110 is associated with a third party and is in communication with AA computer system 100. In some embodiments, AA computer device 110 may be associated with, or be part of merchant bank 140, payment processor 150, and issuer bank 160. In addition, AA computer device 110 is communicatively coupled with merchant 130. In the example embodiment, AA computer device 110 is in communication with merchant 130 and client systems 220 via Application Programming Interface (API) calls. Through the API call, merchant 130 may transmit information to and receive information from AA computer device 110.

In the example embodiment, AA computer device 110 is associated with a payment processor 150 and is configured to provide an enhanced cardholder authentication service. When a customer, such as cardholder 120 shown in FIG. 1, enrolls in the service, the customer provides one or more authentication signatures (e.g., a PIN, password, pattern code, digital signature, biometric signatures, answers to challenge questions, etc.) and account information for one or more payment accounts of the customer to AA computer device 110. The authentication signatures and account information are stored by AA computer device 110 in database 240 as user preferences in a cardholder profile. The user preferences may be rule-based preferences that define steps to be taken for authenticating the user for accessing the user account. In the example embodiment, the cardholder may customize his or her profile. For example, the cardholder may specify a preferred authentication type. The cardholder may also set the authentication type required based on the nature of the payment transaction, the location, the amount of the transaction, the time of the transaction, and/or any combination of the above. The cardholder may also set the method of communication desired. In some embodiments, the method of communication may be specific to a particular merchant, location, time, or payment amount. The cardholder may also login to AA computer device 110 using a client system 220 to update or change the cardholder preferences.

In some embodiments, AA computer device 110 may be associated with the financial transaction payment processor 150 and may be referred to as an interchange computer system. AA computer device 110 may be used for processing transaction data and analyzing the data for fraudulent transactions. In addition, at least one of client systems 220 may include a computer system associated with issuer 160 of a transaction card. Accordingly, AA computer device 110 and client systems 220 may be utilized to process transaction data relating to purchases cardholder 120 makes utilizing a transaction card processed by payment processor 150 and issued by the associated issuer 160. At least one client system 220 may be associated with a user or cardholder 120 seeking to register, access information, or process a transaction with at least one of payment processor 150, issuer 160, or merchant 130. In addition, client systems 220 may include POS devices associated with merchant 130 and used for processing payment transactions. Furthermore, client systems 220 may be used by cardholders or other users to access user accounts online, such as through ecommerce gateways.

Figure 5:
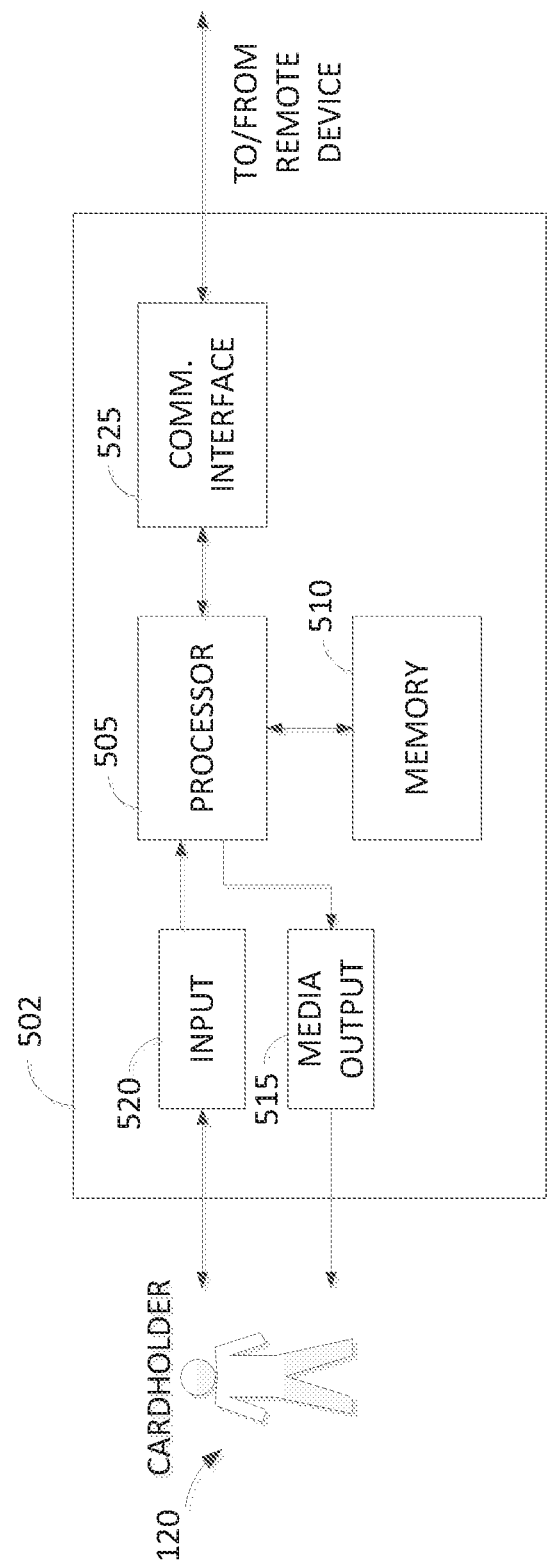

FIG. 5 illustrates an example configuration of a computer device 502 in accordance with one embodiment, of the present disclosure. In the example embodiment, client system 220 is implemented using user computer device 502. In other embodiments, user computer device 502 may be a POS system or a merchant operated computer device. In the example embodiment, user computer device 502 is operated by cardholder 120. User computer device 502 may be used to implement, but is not limited to, client systems 220, computer devices associated with merchant 130, and computer devices associated with cardholder 120 (both shown in FIG. 1). User computer device 502 includes a processor 505 for executing instructions. In some embodiments, executable instructions are stored in a memory area 510. Processor 505 may include one or more processing units (e.g., in a multi-core configuration). Memory area 510 is any device allowing information such as executable instructions and/or transaction data to be stored and retrieved. Memory area 510 may include one or more computer-readable media.

User computer device 502 also includes at least one media output component 515 for presenting information to cardholder 120. Media output component 515 is any component capable of conveying information to cardholder 120. In some embodiments, media output component 515 includes an output adapter (not shown) such as a video adapter and/or an audio adapter. An output adapter is operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 515 is configured to present a graphical user interface (e.g., a web browser and/or a client application) to cardholder 120. A graphical user interface may include, for example, an online store interface for viewing and/or purchasing items, and/or a wallet application for managing payment information. In some embodiments, user computer device 502 includes an input device 520 for receiving input from cardholder 120. Cardholder 120 may use input device 520 to, without limitation, select and/or enter one or more items to purchase and/or a purchase request, or to access credential information, and/or payment information. Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as adaptive authentication computer (AA) device 110 (shown in FIG. 2). Communication interface 525 may include, for example, a wired or wireless network adapter and/or a wireless data transceiver for use with a mobile telecommunications network.

Stored in memory area 510 are, for example, computer-readable instructions for providing a user interface to cardholder 120 via media output component 515 and, optionally, receiving and processing input from input device 520. The user interface may include, among other possibilities, a web browser and/or a client application. Web browsers enable users, such as cardholder 120, to display and interact with media and other information typically embedded on a web page or a website from AA computer device 110. A client application allows cardholder 120 to interact with, for example, AA computer device 110. For example, instructions may be stored by a cloud service and the output of the execution of the instructions sent to the media output component 515.

Figure 6:
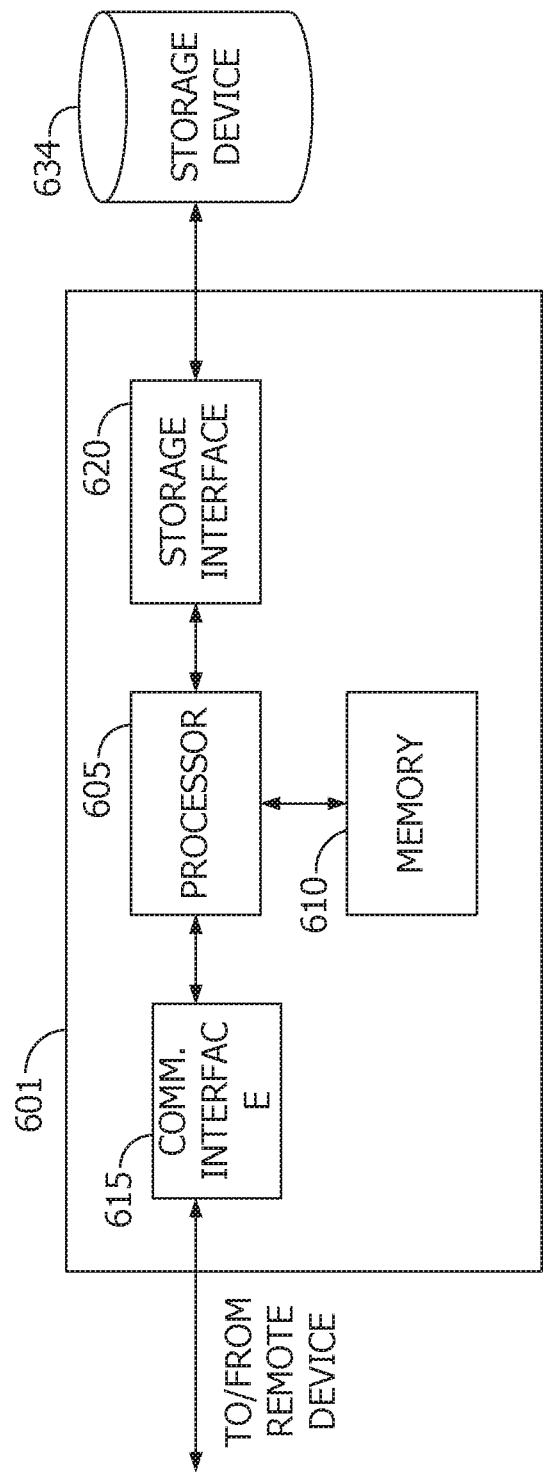

FIG. 6 illustrates an example configuration of a server system 601, in accordance with one embodiment, of the present disclosure. Server computer device 601 may be used to implement, but is not limited to, database server 415 (shown in FIG. 4), merchant 130, and/or adaptive authentication (AA) computer device 110 (both shown in FIG. 1). Server computer device 601 also includes a processor 605 for executing instructions. Instructions may be stored in a memory area 610. Processor 605 may include one or more processing units (e.g., in a multi-core configuration).

Processor 605 is operatively coupled to a communication interface 615 such that server computer device 601 is capable of communicating with a remote device such as another server computer device 601, client systems 220 (shown in FIG. 2), merchant 130, and/or AA computer device 110 (both shown in FIG. 1). For example, communication interface 615 may receive requests from client systems 220 via the Internet.

Processor 605 may also be operatively coupled to a storage device 634. Storage device 634 is any computer-operated hardware suitable for storing and/or retrieving data, such as, but not limited to, data associated with database 240 (shown in FIG. 2). In some embodiments, storage device 634 is integrated in server computer device 601. For example, server computer device 601 may include one or more hard disk drives as storage device 634. In other embodiments, storage device 634 is external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 executes computer-executable instructions for implementing aspects of the disclosure. In some embodiments, processor 605 is transformed into a special purpose microprocessor by executing computer-executable instructions or by otherwise being programmed. For example, processor 605 is programmed with the instructions such as those illustrated in FIG. 7.

Figure 7:
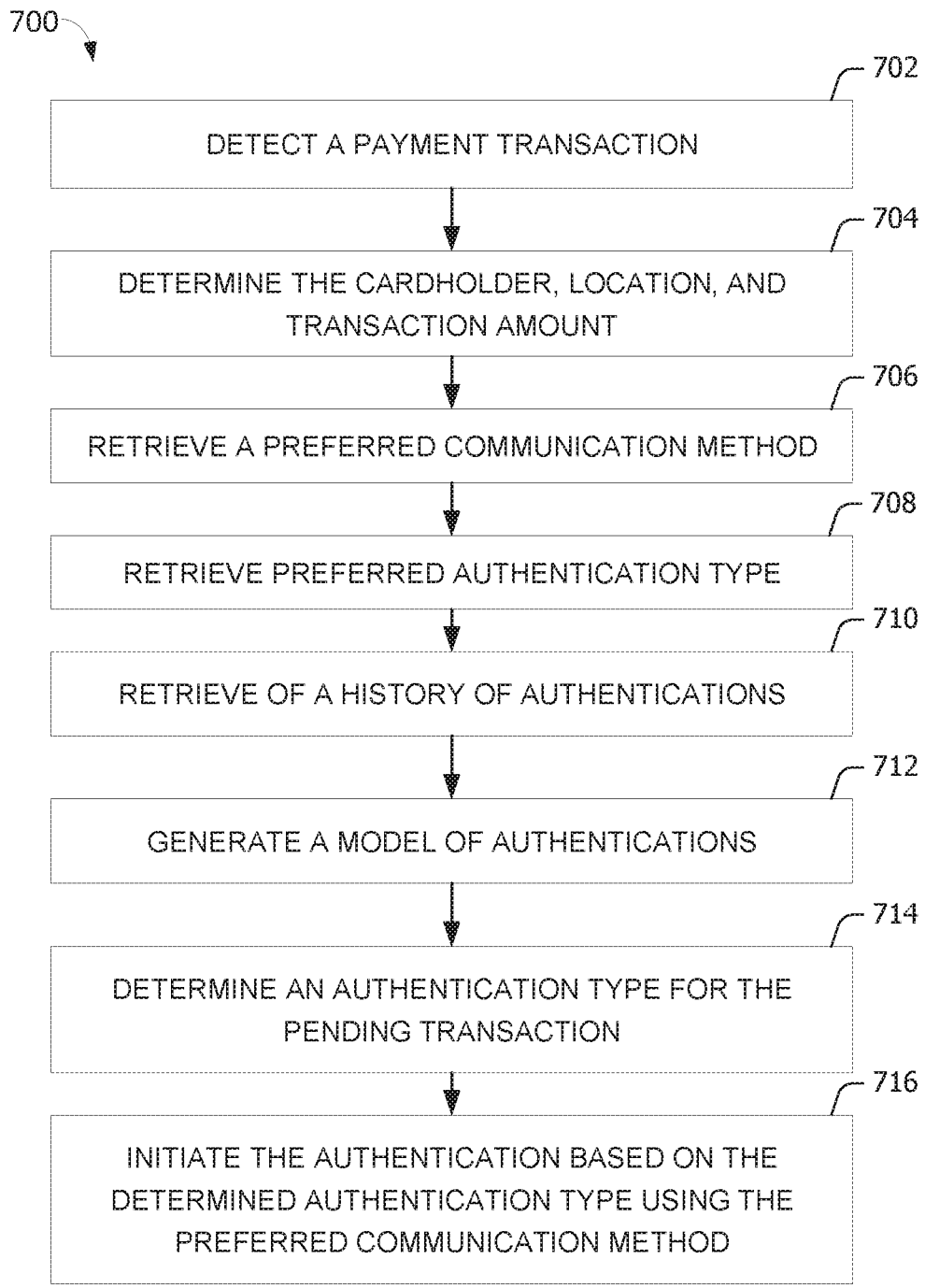

FIG. 7 is a flow chart of a process 700 for improved payment authentication services that may be implemented using adaptive authentication (AA) system 110 shown in FIG. 1.

In the example embodiment, AA computer device 110 detects 702 a payment transaction, e.g. from a payment processor 150 (shown in FIG. 1). The payment transaction includes at least a cardholder identifier, a merchant identifier, and a payment amount. In some embodiments, the payment transaction may include category or another type of classification of the merchant and/or cardholder. This additional data may be further used in generating a model as described below. Using the payment transaction, process 700 determines 704 at least the cardholder associated with the cardholder identifier, a location of the payment transaction, and the payment amount.

In the example embodiment, AA computer device 110 retrieves 706 a preferred communication method. For example, AA computer device 110 may retrieve the preferred communication method from database memory 240 (shown in FIG. 2). The preferred communication method may include a text message, an email, a telephone call, a link to a website, or a POS device. Alternatively or additionally, the preferred communication method may be associated with a specific merchant or category of merchants. For example, cardholder 120 (shown in FIG. 1) may configure AA computer device 110 to initiate an authentication using a text message for payment transactions at restaurants while configuring AA computer device 110 to initiate an authentication using a phone call at gas stations. In some embodiments, the method of communication used to initiate an authentication may be determined at least partially using the model as described herein.

In the example embodiment, AA computer device 110 retrieves 708 a preferred authentication type. The authentication types may include, but are not limited to, a passcode, a PIN, a pattern code, a signature capture, a digital signature, a drawn pattern, one or more challenge questions, and a biometric sample or signature, such as voice recognition or fingerprint. Cardholder 120 preferences may also include preferences on when different authentication types are used. Other examples of authentication types include, but are not limited to, at least one of a low-energy infrared retinal scan, a finger vein scan, a near infrared iris scan, an optical fingerprint scan, a three-dimensional (3D) fingerprint scan, an optical palm print, a 3D facial scan, an optical facial scan, and speech recognition (including text-dependent and text-independent speech recognition).

For example, when logging into cardholder account 170 (shown in FIG. 1) from a particular user computer device 502 (shown in FIG. 5) for the first time, a cardholder preference may indicate that a specific authentication type is to be presented. In a payment transaction example, a cardholder preference may be that the user desires that all charges under $10 do not require an authentication. In another payment transaction example, a cardholder preference may define a dollar threshold for the authentication type based on location. In this example, cardholder 120 sets a $100 threshold within 5 miles of cardholder's 120 residence, where transactions under this threshold amount in the approved area do not require an authentication. However, transactions over that amount within the same radius require a defined authentication type. Cardholder 120 may also require that all transactions outside of the 5 mile area require a different authentication type, and that transactions outside of the 5 mile area and over a threshold dollar amount require more than one authentication and/or a heightened authentication type.

In the example embodiment, AA computer device 110 retrieves 710 a history of authentication. The history of authentications may be drawn from authentications previously initiated by AA computer device 110 for cardholder 120. In some embodiments, the history of authentications may include authentications for any cardholder initiated at similar merchants and/or similar payment transaction amounts and/or within the same geographical location and/or within a statistical distribution of frequency and/or during or particular time of day or some combination thereof. In other embodiments, the history of authentications may be limited to authentications completed at the same merchant and/or by the same cardholder. In some embodiments, the history of authentications by cardholder 120 is weighted differently from the history of authentications by other cardholders. In some embodiments, the greatest weight may be given to the history of authentications that include data where cardholder 120 has requested an additional and/or alternate authentication types and/or declined an authentication request and/or re-configured cardholder's 120 cardholder preferences.

In the example embodiment, AA computer device 110 generates 712 a model representing at least authentications for cardholder 120. AA computer device 110 analyzes cardholder's 120 preferences and the history of authentications to generate 712 the model. For example, cardholder 120 may set authentication preferences based on transaction category, where, for example, payment transactions for fuel and/or parking do not require authentication, or where other payment transaction types, such as food and jewelry, would. Alternatively or additionally, the model may be based on the geographic location of the payment transaction, the transaction type, transaction volume, and amount of the payment transaction. In some embodiments, the model may also represent preferred methods of communication for cardholder 120. In some embodiments, the AA computer device 110 may store the model in database 240 (shown in FIG. 2). In some embodiments, AA computer device 110 may monitor and/or detect payment transaction data from payment processor 150. AA computer device 110 may update the model based on new payment transaction data from other ongoing transactions.

In the example embodiment, AA computer device 110 determines 714, using the model, an authentication type to use to authenticate cardholder 120 for the pending transaction. AA computer device 110 may base determination 714 of the one or more authentications on at least one generated 712 model. In some embodiments, the model will be used to determine whether or not an authentication is warranted. If an authentication is warranted, AA computer device 110 determines 714 which authentication type is needed.

In the example embodiment, AA computer device 110 initiates 716 the one or more authentications to the user attempting to access cardholder account 170. In the example embodiment, AA computer device 110 transmits the one or more authentications to client system 220 (shown in FIG. 2), such as a mobile computer device, a POS device, and a user computer device, where client system 220 is configured to present the one or more authentication requests to the user. In some embodiments, client system 220 is in communication with another computer device, such as through a Near Field Communication (NFC) connection. In these embodiments, client system 220 transmits the one or more authentication requests to the other computer device to be presented to the user attempting access. Client system 220 receives the response(s) from the user and transmits those responses to AA computer device 110. AA computer device 110 determines whether or not to authenticate the user based on the response(s) to the one or more authentication requests. In the example embodiment, AA computer device 110 transmits that determination to the requestor. In other embodiments, AA computer device 110 transmits the results of the authentication to the requestor and the requestor determines whether or not the user is authenticated. In some embodiments, the requestor may be, for example, issuer bank 160 (shown in FIG. 1).

In some embodiments, database 240 also contains a plurality of issuer preferences associated with the issuer associated with the user account. The issuer preferences may be rule-based preferences that define steps to be taken for authenticating the user for accessing cardholder account 170. In some embodiments, the issuer is similar to issuer bank 160. In other embodiments, the issuer may be the administrator of the user accounts, such as the administrator of a webpage. The issuer preferences are similar to the user preferences, but from the issuer point of view. These preferences contain any restrictions or preferences that the issuer has on user access to the user account. For example, issuer preferences may include preferred authentication types, thresholds for different authentication types, and/or other authentication rules. AA computer device 110 compares the user preferences with the issuer preferences to generate 712 and/or modify the model and determine 714 the authentication type to use based on the modified model. For example, the user may have a preference for authentication types A & B and the issuer may have a preference set for authentication types B & C. In this case, AA computer device 110 determines that the authentication type is to be B. In another example, the user has configured a requirement that authentication type A is required when the transaction is more than $150 and the issuer has specified a requirement that authentication type B is required when the transaction is more than $100. If the transaction is $125, then authentication type B is transmitted to the user. In some embodiments, issuer preferences overrule user preferences.

In some embodiments, database 240 also contains a plurality of requestor preferences associated with the requestor associated with the transaction data. The requestor preferences may be rule-based preferences that define steps to be taken for authenticating the user for accessing the user account. In the example embodiment, the requestor is merchant 130 requesting access to funds in cardholder account 170 (shown in FIG. 1). The requestor preferences are similar to the user preferences, but from the requestor (or merchant) point of view. These preferences contain any restrictions or preferences that the requestor has on user access to the user account. For example, requestor preferences may include preferred authentication types, thresholds for different authentication types, and/or other authentication rules. AA computer device 110 compares the user preferences with the requestor preferences to generate 712 and/or modify the model. In these embodiments, AA computer device 110 may compare the cardholder preferences, the requestor preferences, and the issuer preferences in determining the one or more authentication types. In some situations, where there is a conflict between the cardholder preferences, the requestor preferences, and the issuer preferences, AA computer device 110 may include one or more rules about which preferences have priority. AA computer device 110 may also determine that multiple authentication types are required based on the cardholder preferences, the requestor preferences, and the issuer preferences.

In some embodiments, AA computer device 110 determines 714 the authentication type to use based on the capabilities of a POS device associated with the payment transaction. For example, if the POS device is unable to receive a biometric sample, such as a fingerprint, from cardholder 120 (shown in FIG. 1), then AA computer device 110 will base the determined one or more authentication types on that capability. In that situation, AA computer device 110 may request a different authentication type that the POS device is capable of performing. Alternatively, AA computer device 110 may transmit the authentication type for the fingerprint to a mobile device, such as a smartphone, associated with cardholder 120, where the mobile device is capable of taking an image of candidate cardholder's fingerprint.

In some embodiments, cardholder 120 has a plurality of payment accounts (for different payment cards) stored in a virtual wallet. In these embodiments, AA computer device 110 determines a payment account for the payment transaction based in part on the user preferences. For example, the user may have a payment card that is preferred for fuel purchases. In this example, AA computer device 110 determines that the payment transaction is for fuel and selects the preferred card for that transaction. In other embodiments, AA computer device 110 may determine the payment card to select based on a promotional rate or reward associated with the different payment cards. In some embodiments, AA computer device 110 determines which payment account to use based on the type of the payment transaction, a current balance associated with each of the payment accounts 170, and one or more potential rewards for using each particular payment account with the payment transaction.

Figure 8:
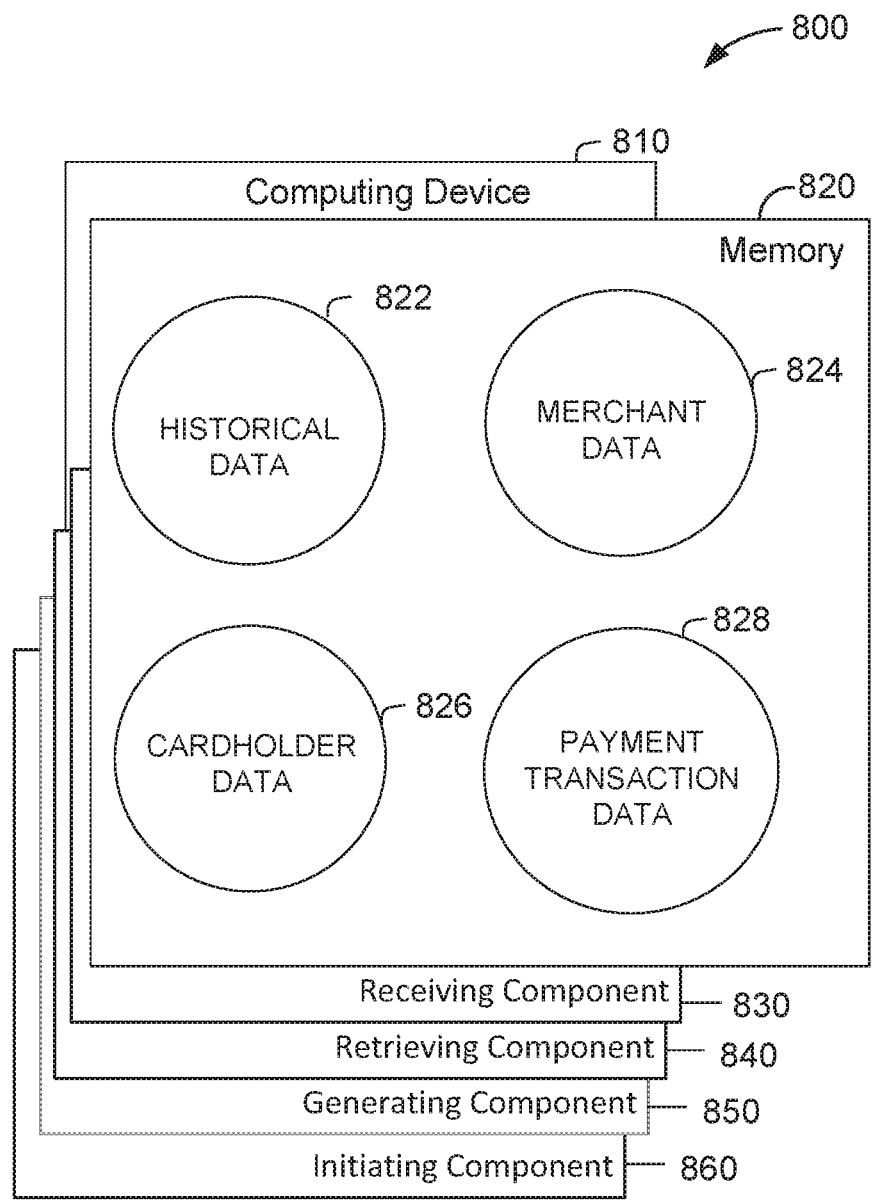

FIG. 8 is a diagram 800 of components of one or more example computer devices that may be used in AA computer system 100 shown in FIG. 1. In some embodiments, computer device 810 is similar to AA computer device 110 (shown in FIG. 1). Database 820 may be coupled with several separate components within computer device 810, which perform specific tasks. In this embodiment, database 820 includes historical data 822, merchant data 824, cardholder data 826, and payment transaction data 828. In some embodiments, database 820 is similar to database 240 (shown in FIG. 2).

Computer device 810 includes database 820, as well as a receiving component 830. Computer device 810 also includes a retrieving component 840 for retrieving a preferred communication method 706, a preferred authentication type 708, and a history of authentications 710 (all shown in FIG. 7). Computer device 810 also includes a generating component 850 for generating 712 a model representing authentications (shown in FIG. 7). An initiating component 860 initiates 716 (shown in FIG. 7) an authentication using the preferred communication method.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An adaptive authentication (AA) system for improved fraud prevention and payment transaction authentication services, said system comprising:
   at least one memory device for storing data including executable instructions; and
   an AA computer device including at least one processor for executing the instructions and in communication with a payment processing network, the AA computer device in communication with the memory device and configured to:
      store user preferences for each of a plurality of cardholders;
      retrieve, from a database, (i) historical transaction data for a plurality of historical transactions processed over the payment processing network by the plurality of cardholders, and (ii) a respective one of a plurality of cardholder authentication types used for each of the historical transactions;
      build, based on the historical transaction data, a plurality of example data sets, each of the example data sets including, for a respective particular merchant and a respective particular cardholder, i) a preferred one of the plurality of cardholder authentication types used by the particular cardholder for transactions with the particular merchant and ii) a combination of transaction parameters including a frequency of transactions by the particular cardholder with the particular merchant, a range of transaction amounts for transactions by the particular cardholder with the particular merchant, and a geographic location of the particular merchant;
      generate a model from the plurality of example data sets built based on the historical transaction data;
      receive pending transaction data for each of a plurality of pending transactions from the payment processing network, the pending transaction data for each of the plurality of pending transactions including a cardholder identifier of a respective cardholder of the plurality of cardholders, a pending transaction merchant identifier associated with a particular merchant for each transaction, and a pending transaction amount;
      for each of the plurality of pending transactions, apply a machine learning program to the generated model to dynamically predict a preferred cardholder authentication type for a current cardholder associated with each transaction by:
         inputting, into the machine learning program, particular example data sets from the plurality of example data sets that correspond to historical transactions performed at the particular merchant by cardholders that are similar to the current cardholder;
         training the machine learning program by analyzing, using deep learning algorithms of the machine learning program, the inputted particular example data sets to recognize at least one pattern in the historical transactions performed at the particular merchant by the similar cardholders;
         inputting the pending transaction data for each of the plurality of pending transactions into the trained machine learning program as a novel input; and
         dynamically predicting, using the trained machine learning program, the preferred cardholder authentication type based on i) the novel input including the pending transaction data and ii) the at least one pattern recognized using the deep learning algorithms; and
      transmit to a cardholder computing device of the respective current cardholder associated with the transaction for each of the plurality of pending transactions an authentication request of the corresponding dynamically predicted preferred cardholder authentication type.

2. The AA computer system of claim 1, wherein at least one of the plurality of historical transactions is associated with the respective cardholder.

3. The AA computer system of claim 1, wherein each of the plurality of historical transactions is associated with a cardholder other than the respective cardholder.

4. The AA computer system of claim 1, wherein the dynamically predicted preferred cardholder authentication type is one of a PIN, a one-time password, a pattern code, a passcode, a digital signature, a signature capture, a biometric signature, a biometric sample, a challenge question, a low-energy infrared retinal scan, a finger vein scan, a near infrared iris scan, an optical fingerprint scan, a three-dimensional (3D) fingerprint scan, an optical palm print, a 3D facial scan, an optical facial scan, and a speech recognition sample.

5. The AA computer system of claim 1, wherein the AA computer device is further configured to retrieve, from the user preferences stored in the at least one memory device using the cardholder identifier, a preferred contact channel of the cardholder, wherein the preferred contact channel includes at least one of a text message, an email, a telephone call, a link to a website, and a point-of-sale device.

6. The AA computer system of claim 1, wherein the AA computer device is further configured to:
   transmit, to the cardholder computing device in response to the pending transaction data, a request to identify a specified preferred one of the cardholder authentication types;
   receive, from the cardholder computing device, a specified preferred cardholder authentication type corresponding to specified transaction parameters; and
   store, in the at least one memory device in association with the cardholder identifier of the respective cardholder, a cardholder-specific update to the model based on the specified preferred cardholder authentication type and the specified transaction parameters.

7. The AA computer system of claim 1, wherein the transaction parameters further include a geographic location of the transaction relative to a cardholder home geographic area.

8. A computer-implemented method for improved fraud prevention and payment transaction authentication services, the method implemented using an adaptive authentication (AA) computer device including at least one processor for executing instructions and in communication with a payment processing network, and at least one memory device for storing data including the executable instructions, the AA computer device in communication with the memory device, said computer-implemented method comprising:
   storing user preferences for each of a plurality of cardholders;

retrieving, from a database, (i) historical transaction data for a plurality of historical transactions processed over the payment processing network by the plurality of cardholders, and (ii) a respective one of a plurality of cardholder authentication types used for each of the historical transactions;

building, based on the historical transaction data, a plurality of example data sets, each of the example data sets including, for a respective particular merchant and a respective particular cardholder, i) a preferred one of the plurality of cardholder authentication types used by the particular cardholder for transactions with the particular merchant and ii) a combination of transaction parameters including a frequency of transactions by the particular cardholder with the particular merchant, a range of transaction amounts for transactions by the particular cardholder with the particular merchant, and a geographic location of the particular merchant;

generating, using the at least one processor, a model from the plurality of example data sets built based on the historical transaction data;

receiving pending transaction data for each of a plurality of pending transactions from the payment processing network, the pending transaction data for each of the plurality of pending transactions including a cardholder identifier of a respective cardholder of the plurality of cardholders, a pending transaction merchant identifier associated with a particular merchant for each transaction, and a pending transaction amount;

for each of the plurality of pending transactions, apply a machine learning program to the generated model to dynamically predict a preferred cardholder authentication type for a current cardholder associated with each transaction by:

inputting, into the machine learning program, particular example data sets from the plurality of example data sets that correspond to historical transactions performed at the particular merchant by cardholders that are similar to the current cardholder;

training the machine learning program by analyzing, using deep learning algorithms of the machine learning program, the inputted particular example data sets to recognize at least one pattern in the historical transactions performed at the particular merchant by the similar cardholders;

inputting the pending transaction data for each of the plurality of pending transactions into the trained machine learning program as a novel input; and dynamically predicting, using the trained machine learning program, the preferred cardholder authentication type based on i) the novel input including the pending transaction data and ii) the at least one pattern recognized using the deep learning algorithms; and transmitting to a cardholder computing device the respective current cardholder associated with the transaction for each of the plurality of pending transactions an authentication request of the corresponding dynamically predicted preferred cardholder authentication type.

9. The computer-implemented method of claim 8, wherein at least one of the plurality of historical transactions is associated with the respective cardholder.

10. The computer-implemented method of claim 8, wherein each of the plurality of historical transactions is associated with a cardholder other than the respective cardholder.

11. The computer-implemented method of claim 8, wherein the dynamically predicted preferred cardholder authentication type is one of a PIN, a one-time password, a pattern code, a passcode, a digital signature, a signature capture, a biometric signature, a biometric sample, a challenge question, a low-energy infrared retinal scan, a finger vein scan, a near infrared iris scan, an optical fingerprint scan, a three-dimensional (3D) fingerprint scan, an optical palm print, a 3D facial scan, an optical facial scan, and a speech recognition sample.

12. The computer-implemented method of claim 8, further comprising retrieving, from the user preferences stored in the at least one memory device, a preferred contact channel of the cardholder, wherein the preferred contact channel includes at least one of a text message, an email, a telephone call, a link to a website, and a point-of-sale device.

13. The computer-implemented method of claim 8, further comprising:

transmitting, to the cardholder associated with the cardholder identifier in response to the pending transaction data, a request to identify a specified preferred one of the cardholder authentication types;

receiving, from the cardholder computing device, a specified preferred cardholder authentication type corresponding to specified transaction parameters; and storing, in the at least one memory device in association with the cardholder identifier of the respective cardholder, a cardholder-specific update to the model based on the specified preferred cardholder authentication type and the specified transaction parameters.

14. At least one non-transitory computer-readable storage medium having computer-executable instructions embodied thereon, wherein when executed by an adaptive authentication (AA) computer device for improved fraud prevention and payment transaction authentication services, the AA computer device including at least one processor in communication with a payment processing network and at least one memory device, the computer-executable instructions cause the at least one processor to:

store user preferences for each of a plurality of cardholders;

retrieve, from a database, (i) historical transaction data for a plurality of historical transactions processed over the payment processing network by the plurality of cardholders, and (ii) a respective one of a plurality of cardholder authentication types used for each of the historical transactions;

build, based on the historical transaction data, a plurality of example data sets, each of the example data sets including, for a respective particular merchant and a respective particular cardholder, i) a preferred one of the plurality of cardholder authentication types used by the particular cardholder for transactions with the particular merchant and ii) a combination of transaction parameters including a frequency of transactions by the particular cardholder with the particular merchant, a range of transaction amounts for transactions by the particular cardholder with the particular merchant, and a geographic location of the particular merchant;

generate a model from the plurality of example data sets built based on the historical transaction data;

receive pending transaction data for each of a plurality of pending transactions from the payment processing network, the pending transaction data for each of the plurality of pending transactions including a cardholder identifier of a respective cardholder of the plurality of cardholders, a pending transaction merchant identifier associated with a particular merchant for each transaction, and a pending transaction amount;

for each of the plurality of pending transactions, apply a machine learning program to the generated model to dynamically predict a preferred cardholder authentication type for a current cardholder associated with each transaction by:

inputting, into the machine learning program, particular example data sets from the plurality of example data sets that correspond to historical transactions performed at the particular merchant by cardholders that are similar to the current cardholder;

training the machine learning program by analyzing, using deep learning algorithms of the machine learning program, the inputted particular example data sets to recognize at least one pattern in the historical transactions performed at the particular merchant by the similar cardholders;

inputting the pending transaction data for each of the plurality of pending transactions into the trained machine learning program as a novel input; and dynamically predicting, using the trained machine learning program, the preferred cardholder authentication type based on i) the novel input including the pending transaction data and ii) the at least one pattern recognized using the deep learning algorithms; and transmit to a cardholder computing device of the respective current cardholder associated with the transaction for each of the plurality of pending transactions an authentication request of the corresponding dynamically predicted preferred cardholder authentication type.

15. The non-transitory computer-readable storage medium of claim 14, wherein at least one of the plurality of historical transactions is associated with the respective cardholder.

16. The non-transitory computer-readable storage medium of claim 14, wherein each of the plurality of historical transactions is associated with a cardholder other than the respective cardholder.

17. The non-transitory computer-readable storage medium of claim 14, wherein the dynamically predicted preferred cardholder authentication type is one of a PIN, a one-time password, a pattern code, a passcode, a digital signature, a signature capture, a biometric signature, a biometric sample, a challenge question, a low-energy infrared retinal scan, a finger vein scan, a near infrared iris scan, an optical fingerprint scan, a three- dimensional (3D) fingerprint scan, an optical palm print, a 3D facial scan, an optical facial scan, and a speech recognition sample.

* * * * *

UNITED STATES PATENT AND TRADEMARK OFFICE
CERTIFICATE OF CORRECTION

| | | |
|---|---|---|
| PATENT NO. | : 11,880,842 B2 | Page 1 of 1 |
| APPLICATION NO. | : 16/222780 | |
| DATED | : January 23, 2024 | |
| INVENTOR(S) | : Brian Piel | |

It is certified that error appears in the above-identified patent and that said Letters Patent is hereby corrected as shown below:

On the Title Page

In item (54), in Title, delete "UNITED STATES SYSTEM AND METHODS FOR DYNAMICALLY DETERMINED CONTEXTUAL, USER-DEFINED, AND ADAPTIVE AUTHENTICATION" and insert therefor -- SYSTEM AND METHODS FOR DYNAMICALLY DETERMINED CONTEXTUAL, USER-DEFINED, AND ADAPTIVE AUTHENTICATION --.

In the Specification

Column 1, Lines 1-4, delete "UNITED STATES SYSTEM AND METHODS FOR DYNAMICALLY DETERMINED CONTEXTUAL, USER-DEFINED, AND ADAPTIVE AUTHENTICATION" and insert therefor -- SYSTEM AND METHODS FOR DYNAMICALLY DETERMINED CONTEXTUAL, USER-DEFINED, AND ADAPTIVE AUTHENTICATION --.

Signed and Sealed this
Ninth Day of April, 2024

Katherine Kelly Vidal
*Director of the United States Patent and Trademark Office*